(12) United States Patent
Babinowich et al.

(10) Patent No.: US 11,989,848 B2
(45) Date of Patent: May 21, 2024

(54) BROWSER OPTIMIZED INTERACTIVE ELECTRONIC MODEL BASED DETERMINATION OF ATTRIBUTES OF A STRUCTURE

(71) Applicant: Yembo, Inc., San Diego, CA (US)

(72) Inventors: Kyle Babinowich, San Diego, CA (US); Maciej Halber, San Diego, CA (US); Marc Eder, San Diego, CA (US); Janpreet Singh, San Diego, CA (US); Zach Rattner, San Diego, CA (US); Siddharth Mohan, San Diego, CA (US)

(73) Assignee: YEMBO, INC., San Diego, CA (US)

( * ) Notice: Subject to any disclaimer, the term of this patent is extended or adjusted under 35 U.S.C. 154(b) by 70 days.

(21) Appl. No.: 17/946,384

(22) Filed: Sep. 16, 2022

(65) Prior Publication Data
US 2023/0093087 A1 Mar. 23, 2023

Related U.S. Application Data

(60) Provisional application No. 63/245,340, filed on Sep. 17, 2021.

(51) Int. Cl.
*G06T 19/20* (2011.01)
*G06V 10/774* (2022.01)
(Continued)

(52) U.S. Cl.
CPC ............ *G06T 19/20* (2013.01); *G06V 10/774* (2022.01); *G06V 10/82* (2022.01); *G06F 3/0482* (2013.01);
(Continued)

(58) Field of Classification Search
None
See application file for complete search history.

(56) References Cited

U.S. PATENT DOCUMENTS 11,106,911 B1 * 8/2021 Fathi .................... B64C 39/024
11,368,631 B1 * 6/2022 Leshem Gat ............. G06T 5/50
(Continued)

FOREIGN PATENT DOCUMENTS

WO 2021/178537 A1 9/2021

OTHER PUBLICATIONS

Patent Cooperation Treaty, International Search Report and Written Opinion issued in PCT/IB2022/058792, dated Jan. 3, 2023, pp. 1-10.

*Primary Examiner* — Tize Ma
(74) *Attorney, Agent, or Firm* — Pillsbury Winthrop Shaw Pittman LLP

(57) ABSTRACT

An interactive 3D electronic representation of a physical scene is executed in a browser. The browser has a limited computing capability compared to a native application or hardware usable by the computer. The interactive 3D representation is configured to minimize overall computing resources and processing time. Attributes of data items corresponding to surfaces and/or contents in the physical scene are extracted from the interactive 3D representation. Interactive verification of the attributes of the subset of data items is performed in the browser by: flattening a selected view of a ceiling, floor, or wall two dimensions; receiving user adjustments (if needed) to the dimensions and/or locations of the selected ceiling, floor, or wall; receiving user indications (if needed) of cut outs in the selected ceiling, floor, or wall; and updating the interactive 3D representation based on adjustments to the dimensions and/or locations, and/or the indications of cut outs.

43 Claims, 12 Drawing Sheets

(51) Int. Cl.
   *G06V 10/82* (2022.01)
   *G06F 3/0482* (2013.01)

(52) U.S. Cl.
   CPC .... *G06T 2210/04* (2013.01); *G06T 2219/012* (2013.01); *G06T 2219/2016* (2013.01)

(56) References Cited

U.S. PATENT DOCUMENTS

| | | |
|---|---|---|
| 2018/0032645 A1 | 2/2018 | Wright et al. |
| 2019/0340814 A1 | 11/2019 | Sinclair et al. |
| 2020/0302681 A1 | 9/2020 | Totty et al. |
| 2021/0141965 A1 | 5/2021 | Bell et al. |
| 2021/0173968 A1* | 6/2021 | Yang ...................... G06T 19/20 |
| 2021/0279852 A1 | 9/2021 | Jakka et al. |
| 2021/0279950 A1* | 9/2021 | Phalak ...................... G06T 7/55 |

* cited by examiner $P_o^I = P_o \pm V_o$ → Either or ← $V_o = P_n - P_o$ $P_i^I = P_i \pm V_i$ ; $V_i = P_{(i+1)\%N} - P_i$ $Q_i^I = P_i \pm W_i$ ; $W_i = P_i - P_{(i-1)\%N}$ $(P_i^I, Q_{(i+1)\%N}^I)$

BROWSER OPTIMIZED INTERACTIVE ELECTRONIC MODEL BASED DETERMINATION OF ATTRIBUTES OF A STRUCTURE

CROSS REFERENCE TO RELATED APPLICATIONS

This application is based on, and claims the benefit of priority to, United States provisional patent application number 63,245,340, filed Sep. 17, 2021, the entire contents of which are incorporated herein by reference.

FIELD OF THE DISCLOSURE

This disclosure relates to browser optimized interactive electronic model based determination of attributes of a structure.

BACKGROUND

Various tasks for home services revolve around an accurate three-dimensional spatial and semantic understanding of a location such as a home. For example, planning renovations requires understanding the current state and dimensions of the home. Filing an insurance claim requires accurate documentation and measurements of structures and/or corresponding damages. Moving into a new home requires a reliable estimate as to whether one's belongings and furniture will fit, for example. Currently, achieving the requisite three-dimensional spatial and semantic understanding involves manual measurements, hard-to-acquire architectural drawings, and/or arrangements with multiple parties with competing schedules and interests.

A simplified and more user friendly system for capturing images and videos of a location, and generating accurate virtual representations based on the captured images and videos is needed. For example, a system that can use the images and videos to automatically generate virtual representations is desired. Further, means for interacting with the virtual representation are needed to enable the user to easily extract, or modify desired information about the location or items at the location.

SUMMARY

Systems, methods, and computer program products are disclosed that facilitate receiving description data of a location in the form of a video feed, for example, from a client device controlled by a user, and/or other forms. The received data serves as an input to a model (e.g., an artificial intelligence (AI)-based model such as a machine learning model) configured to generate an interactive three dimensional electronic representation of the location enriched with spatially localized details about surfaces and contents of the location. The interactive three dimensional electronic representation can be used for various purposes.

The present disclosure provides a system that resolves several impediments in existing three dimensional (3D) visualization systems by creating an interactive 3D representation of a physical scene at a location, and enabling this representation to be a platform for collaborative interaction for services and/or tasks to be performed by a user via a browser running on a user's computing device (e.g., a smartphone, for example). The virtual representation includes interactive 3D representation of a physical scene the location that is appropriately textured to match the corresponding physical scene at the location, annotated to describe elements of the location on the interactive 3D representation, and associated with metadata such as audio, visual, geometric, and natural language media that can be spatially localized within the context of the interactive 3D representation. Comments and notes may also be associated with the interactive 3D representation of the physical scene at the location.

Typical 3D construction applications are heavily taxing on both central processing unit (CPU) and graphics processing unit (GPU) hardware, often requiring dedicated hardware to achieve fluid and lag free performance. These applications are typically stand alone and require installation and loading on a computing device due to these hardware requirements. Porting such capability to a single page application that can be loaded with relatively limited resources available in a browser is a challenge that the present systems and methods overcome.

To overcome this and other challenges, a non-transitory computer readable medium having instructions thereon is provided. The instructions are configured to cause a computer to execute, in a browser, an interactive three dimensional electronic representation of a physical scene at a location to determine attributes of the physical scene. Executing may include following a set of machine readable instructions stored in a computer readable storage medium for generating, determining, running, displaying, etc., the three dimensional electronic representation. The browser may have a limited computing capability compared to a native application or hardware usable by the computer. The interactive three dimensional representation is configured to minimize overall computing resources and processing time for determining the attributes. The instructions cause operations comprising receiving video images of the physical scene. The video images may be generated via a camera associated with a user. The operations comprise generating, with a trained machine learning model, the interactive three dimensional representation of the physical scene. The interactive three dimensional representation comprises a textured or untextured three-dimensional mesh with vertices connected by edges, defining triangular or quadrilateral planar faces. The vertices and the faces each separately comprise position, color, and/or surface normal information. The operations comprise extracting data items from the interactive three dimensional representation with the trained machine learning model. The data items correspond to surfaces and/or contents in the physical scene. The operations comprise determining attributes of the data items with the trained machine learning model. The attributes comprise dimensions and/or locations of the surfaces and/or contents. The operations comprise identifying a subset of the data items with the trained machine learning model. The subset of the data items comprise a ceiling, a floor, and walls of the physical scene. The operations comprise causing interactive human verification of the attributes of the subset of data items by: receiving user selection of the ceiling, the floor, or a wall, and flattening a view of the selected ceiling, floor, or wall from the interactive three dimensional representation to two dimensions; receiving user adjustments to the dimensions and/or locations of the selected ceiling, floor, or wall; receiving user indications of cut outs in the selected ceiling, floor, or wall, a cut out comprising a window, a door, or a vent in the selected ceiling, floor, or wall; and updating, with the trained machine learning model, the interactive three dimensional representation based on adjustments to the dimensions and/or locations, and/or the indications of cut outs for continued display an manipulation in the browser.

According to another embodiment, there is provided a non-transitory computer readable medium having instructions thereon, the instructions configured to cause a computer to execute an interactive three dimensional electronic representation of a physical scene at a location to determine a floor plan of the physical scene, the instructions causing operations comprising: receiving description data of the physical scene at the location, generating, with a trained machine learning model, the interactive three dimensional representation of the physical scene based on the description data, the interactive three dimensional representation comprising data items corresponding to surfaces and/or contents in the physical scene; and determining, based on the interactive three dimensional representation and the data items, the floor plan, by: transferring detections of physical scene structures indicated by the data items to the interactive three dimensional representation; determining co-planar regions of the three dimensional representation for wall separation; determining wall segments within a floor plane of the three dimensional representation; tessellating the floor plane using the determined wall segments; classifying cells of the tessellation as floor or not floor; and extracting a floor plan polygon from cells classified as floor.

According to another embodiment, there is provided a non-transitory computer readable medium having instructions thereon, the instructions configured to cause a computer to execute an interactive three dimensional electronic representation of a physical scene at a location to determine one or more walls of the physical scene, the instructions causing operations comprising: receiving description data of the physical scene at the location, generating, with a trained machine learning model, the interactive three dimensional representation of the physical scene based on the description data, the interactive three dimensional representation comprising data items corresponding to surfaces and/or contents in the physical scene; and determining, based on the interactive three dimensional representation and the data items, the one or more walls, by: transferring detections of physical scene structures indicated by the data items to the interactive three dimensional representation; extruding wall rectangles from a floor plan of the physical scene, the floor plan previously determined based on the interactive three dimensional representation; determining co-planar regions of the three dimensional representation for separation of cut outs comprising windows, doors, and/or vents in the one or more walls; determining a bounding rectangle for each separated cut out; filtering detected cut outs; associating a bounding rectangle with a wall rectangle; and projecting bounding rectangles to an associated wall to determine the wall surface area in the physical scene.

According to other embodiments, systems and/or methods configured to perform the operations described above are also provided.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to particular implementations, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
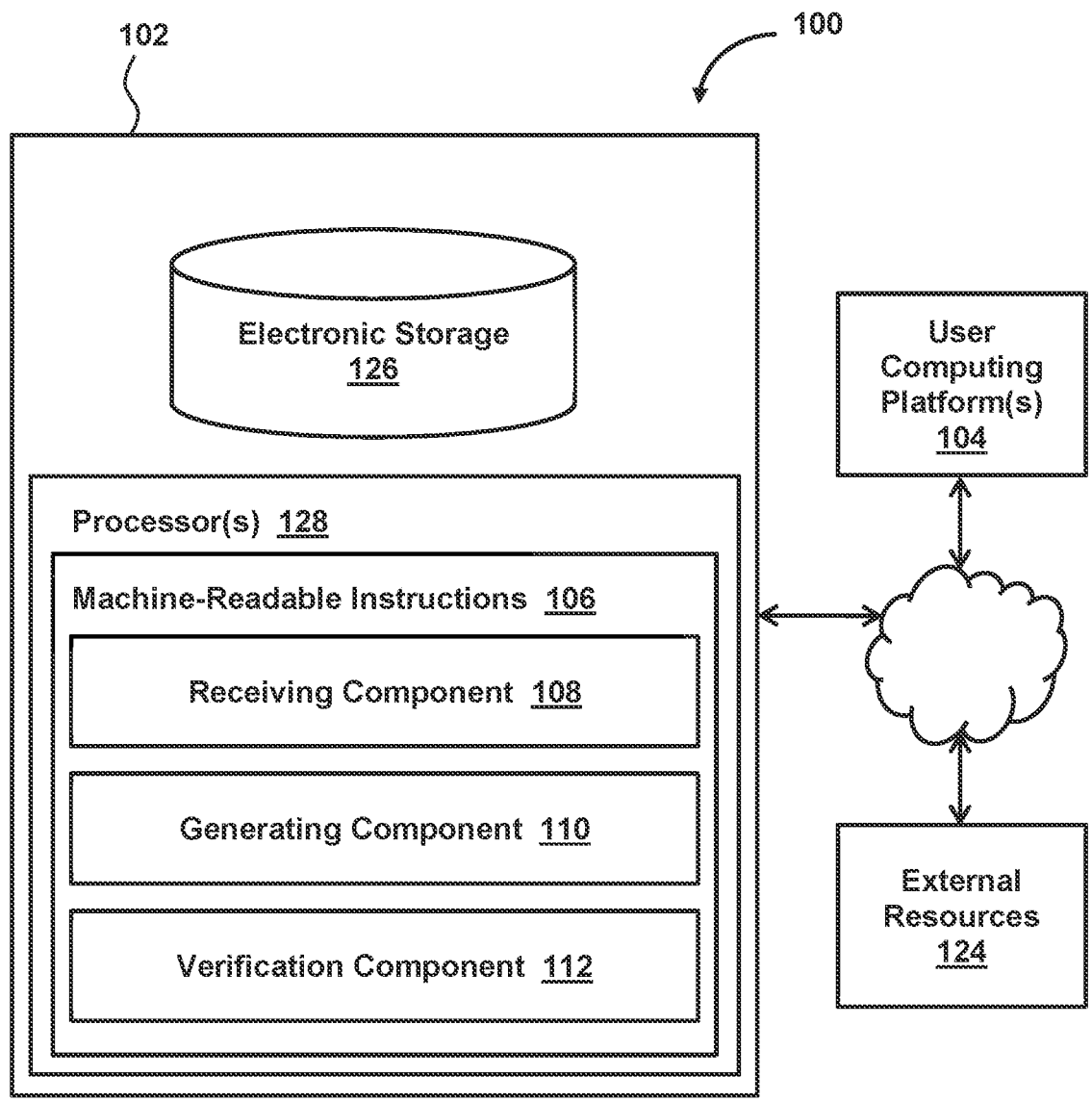
FIG. 1 illustrates a system for executing an interactive 3D electronic representation of a physical scene at a location to determine attributes of the physical scene utilizing artificial intelligence (AI) such as a machine learning model, in accordance with one or more embodiments.

As described above, typical 3D construction applications are heavily taxing on both CPU and GPU hardware, often requiring dedicated hardware to achieve fluid and lag free performance. These applications are typically stand alone and require installation and loading on a computing device due to these hardware requirements. Porting such capability to a single page application that can be loaded with relatively limited resources available in a browser is a challenge that the present systems and methods overcome.

The present systems and methods are configured for rendering 3D graphics in a browser with a responsive and efficient approach that facilitates rendering 200,000+ polygons across chrome books, smartphones, PCs, and/or other computing devices combined. The present systems and methods overcome traditional difficulties with 3D rendering in a browser across a variety of devices. Typical 3D rendering programs are written in low level languages such as c/c++ that have access to machine level operations directly able to tap into the GPU for rendering processes (drawing vectors, polygons, rasterization). Most 3D graphics are rendered in a browser through the HTML Canvas element. For a browser, the present systems and methods utilize higher level languages (e.g., JavaScript) which only relatively recently has access to some of these functions via abstracted API layers available in rendering libraries such as WebGL.

In addition, navigating around three dimensions in an interactive 3D electronic representation of a physical scene at a location (such as in the interactive 3D electronic representation described below) can be a disorienting and frustrating experience for users. Clicking with a mouse, for example, is performed in two dimensions. In typical 3D renderings, clicking with a mouse causes a ray to be cast from the location of the click, and a Z dimension (or whatever that third dimension may be) is calculated to be whatever the ray "hits" in the 3D rendering (e.g., or the mesh used to generate the rendering). This method becomes more difficult when things like furniture block a click (e.g., imagine trying to click on a floor but a chair is in the way of the click). Video games solve this problem by having a special interface (e.g. a specialized video game controller) with two joysticks, one for panning the camera in a direction (X,Y,Z) and the other for lateral movements (across one plane such as the floor). Three dimensional applications on PCs either use a similar approach by taking the W, A, S, and D keys and using those to simulate movements on the lateral plane while the mouse is panning the camera in X, Y, Z space.

The present systems and methods do not require these non-intuitive interfaces. The present systems and methods assume a low-level digital literacy for users (e.g., the users need not be experienced gamers). The present systems and methods receive user selection of a ceiling, a floor, or a wall, in an interactive 3D representation, and flatten a view of the selected ceiling, floor, or wall from the interactive 3D representation to two dimensions. Flattening the view of the selected ceiling, floor, or wall from the interactive 3D representation to two dimensions comprises moving a view angle of the interactive 3D representation to face the selected ceiling, floor, or wall; then flattening a height or depth dimension in the view of the selected ceiling, floor, or wall; and forcing additional input form a user into a plane formed by the selected ceiling, floor, or wall.

With the present systems and methods, the view angle of the interactive 3D representation can be moved to a position of a user's device when the device obtained the 2D images and/or video of a physical scene. The present systems and methods are configured to overlay a 2D image obtained by a user on the interactive 3D representation. However, perspectives in a 3D environment are different than in a 2D photo or video. The present systems and methods adjust the view angle to ensure lines of a mesh (described below) align with the corresponding lines in the photo or video. Unfortunately for a user, this adjustment can be an extremely nauseating change to make. The adjustment is accomplished by first, slowly, but purposely moving the view angle to the position where the user was when they took the corresponding photo and/or video. If an adjustment distance is long, the system is configured to cap acceleration and elongate the time to animate so that it is not a quick jump. A background blur is applied to the 3D physical scene. This background blur hides any jarring motion of altering the view angle. The blur also allows minimizes a user's ability to notice differences in mesh material quality which could have occlusions and other lighting issues that make the 3D mesh look less clear than an high definition image. By blurring the 3D portion behind an overlaid 2D image, a user may feel like this is a "zoomed in" portion of the mesh rather than its own singular entity.

The present systems and methods may be used for things like planning renovations to a home, which may require understanding the dimensions and/or current state of the home; obtaining insurance, which may require an inspection and accurate documentation of the home and its contents; and moving into a new home, which requires a reliable estimate as to whether one's belongings and furniture will fit, for example. The present systems and methods reduce or eliminate the time required for an onsite inspection (e.g., by an insurance adjuster) including scheduling an appointment that is convenient for all parties; minimizes error and bias (e.g., because the computer based system described herein behaves the same every time, unlike people); provides accurate, auditable (e.g., recorded video data can be saved), non-human dependent measurements; and/or has other advantages.

FIG. 1 illustrates a system for executing, in a browser, an interactive 3D electronic representation of a physical scene at a location to determine attributes of the physical scene utilizing artificial intelligence (AI) such as a machine learning model, in accordance with one or more embodiments. A physical scene may be indoors or outdoors at the location. The location may be any open or closed spaces for which the interactive 3D representation may be generated. For example, the physical scene at the location may be a room, a warehouse, a classroom, an office space, an office room, a restaurant room, a coffee shop, a room or rooms of a house or other structure, a porch or yard of the structure, etc. The browser may have a limited computing capability compared to a native application or hardware typically usable by a computer. The interactive three dimensional representation is configured to minimize overall computing resources and processing time for determining the attributes.

In some embodiments, system 100 may include one or more servers 102. The server(s) 102 may be configured to communicate with one or more user computing platforms 104 according to a client/server architecture. The users may access system 100 via user computing platform(s) 104. System 100 utilizes information from cameras, depth sensors, microphones, accelerometers, location sensors, inertial measurement unit (IMU) data (e.g., data collected from an accelerometer, a gyroscope, a magnetometer, and/or other sensors), text data, questions asked by a human agent or a machine learning algorithm based on sent images, videos, previous answers as well as answers by the consumer on a mobile device (e.g., smartphone, tablet, and/or other mobile device that forms a user computing platform 104), and/or other information to execute the interactive 3D electronic representation of a physical scene. Executing may include following a set of machine readable instructions stored in a computer readable storage medium for generating, determining, running, displaying, etc., the three dimensional electronic representation, for example.

In some embodiments, server(s) 102, computing platform(s) 104, and/or external resources 124 may be operatively linked via one or more electronic communication links. For example, such electronic communication links may be established, at least in part, via a network such as the Internet and/or other networks. It will be appreciated that this is not intended to be limiting, and that the scope of this disclosure includes embodiments in which server(s) 102, computing platform(s) 104, and/or external resources 124 may be operatively linked via some other communication media.

User computing platforms 104 may communicate description data to server 102. Description data may include one or more of digital photos, images, videos, audio, local digital media items, connected digital media items, and/or other description data. Local digital media items may include digital media items stored locally at a given user computing platform 104. Connected digital media items may include digital media items stored remotely from a given user computing platform 104 such as at other user computing platforms 104, at other locations within system 100, and/or locations outside of system 100. Connected digital media items may be stored in the cloud.

A given computing platform 104 may include one or more processors configured to execute machine-readable instructions. The machine-readable instructions may be configured to enable an expert or user associated with the given computing platform 104 to interface with system 100 and/or external resources 124, and/or provide other functionality attributed herein to computing platform(s) 104. By way of non-limiting example, the given computing platform 104 may include one or more of a desktop computer, a laptop computer, a handheld computer, a tablet computing platform, a Netbook, a Smartphone, a gaming console, and/or other computing platforms.

External resources 124 may include sources of information, hosts and/or providers of social network platforms outside of system 100, external entities participating with system 100, and/or other resources. In some embodiments, some or all of the functionality attributed herein to external resources 124 may be provided by resources included in system 100.

Server(s) 102 may include electronic storage 126, one or more processors 128, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102. It should be noted that, while one or more operations are described herein as being performed by particular components of server 102, those operations may, in some embodiments, be performed by other components of server 102 or other components of system 100. As an example, while one or more operations are described herein as being performed by components of server 102, those operations may, in some embodiments, be performed by components of client a user computing platform 104.

Electronic storage 126 may comprise non-transitory storage media that electronically stores information. The electronic storage media of electronic storage 126 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 126 may store software algorithms, information determined by processor(s) 128, information received from server(s) 102, information received from computing platform(s) 104, and/or other information that enables server(s) 102 to function as described herein.

Processor(s) 128 may be configured to provide information processing capabilities in server(s) 102. As such, processor(s) 128 may include one or more of a digital processor, an analog processor, a digital circuit designed to process information, an analog circuit designed to process information, a state machine, and/or other mechanisms for electronically processing information. Although processor(s) 128 is shown in FIG. 1 as a single entity, this is for illustrative purposes only. In some embodiments, processor(s) 128 may include a plurality of processing units. These processing units may be physically located within the same device, or processor(s) 128 may represent processing functionality of a plurality of devices operating in coordination. The processor(s) 128 may be configured to execute machine-readable instruction 106 components 108, 110, 112, and/or other machine-readable instruction components. Processor(s) 128 may be configured to execute machine-readable instruction components 108, 110, 112, and/or other machine-readable instruction components by software; hardware; firmware; some combination of software, hardware, and/or firmware; and/or other mechanisms for configuring processing capabilities on processor(s) 128. As used herein, the term "machine-readable instructions" may refer to any code and/or other programming, and/or instructions that cause a computing device and/or server to perform the functionality attributed to the components of processors 128.

It should be appreciated that although components 108, 110, and 112 are illustrated in FIG. 1 as being implemented within a single processing unit, in embodiments in which processor(s) 128 includes multiple processing units, one or more of components 108, 110, and/or 112 may be implemented remotely from the other machine-readable instruction components. The description of the functionality provided by the different components 108, 110, and/or 112 described herein is for illustrative purposes, and is not intended to be limiting, as any of machine-readable instruction components 108, 110, and/or 112 may provide more or less functionality than is described. For example, one or more of machine-readable instruction components 108, 110, and/or 112 may be eliminated, and some or all of its functionality may be provided by other ones of machine-readable instruction components 108, 110, and/or 112. As another example, processor(s) 128 may be configured to execute one or more additional machine-readable instruction components that may perform some or all of the functionality attributed herein to one of machine-readable instruction components 108, 110, and/or 112.

The server(s) 102 and/or computing platform(s) 104 may be configured to execute machine-readable instructions 106. The machine-readable instructions 106 may include one or more of a receiving component 108, a generating component 110, a verification component 112, and/or other components. One or more of components 108, 110, and/or 112, may include sub-components related to other applications of the present systems and methods. In some embodiments, some or all of the components may be located in server(s) 102, in computing platform(s) 104, a combination of the two, and/or other computing devices. The machine learning work (e.g., the operations performed by one or more processors 128 and/or the one or more electronic models described herein) may be performed in one or more of the cloud, a mobile device, and/or other devices.

One or more of components 108-112 may cooperate with (e.g., send information to, receive information from, and/or other cooperation) and/or form some or all of the one or more electronic models described herein. Machine readable instructions 106 may be configured to cause server 102 (and/or other computing devices) to execute one or more electronic models. The one or more electronic models may comprise machine learning and/or other artificial intelligence models. The one or more electronic models may comprise various networks, algorithms, equations, lookup tables, heuristics or conditions, 3D geometric models, and/or other models. In some embodiments, the one or more electronic models may include classification algorithms, neural networks, and/or combinations thereof.

The one or more electronic models may include a machine learning model that includes a deep neural net such as a convolutional neural network (CNN), recurrent neural network (RNN), long short term memory (LSTM) network, etc. However, the one or more electronic models are not limited to only these types of networks. The model(s) may be configured to read images either sequentially or as a batch. Multiple different algorithms may be used to process one or more different inputs. In some embodiments, the one or more electronic models may include a multi-stage electronic model for generating an interactive 3D representation comprising data items corresponding to surfaces and/or contents in a physical scene, identifying objects in the physical scene, and/or for other purposes. The multi-stage model may comprise, for example, a trained neural network having a first stage that identifies particular surfaces and/or objects in the physical scene, and a second stage configured to generate the interactive 3D electronic representation of the physical scene.

In some embodiments, the electronic model may use one or more geometric 3D reconstruction frameworks such as Structure-from-Motion (SfM), Simultaneous Localization and Mapping (SLAM), and Multi-View Stereo (MVS) to create one or more interactive 3D electronic representations of a physical scene at a location that can be used in conjunction with object identifications in order to generate the interactive 3D electronic representation of the physical scene. Using information about the intrinsics of the camera (e.g. focal length and principal point) and its relative orientation in the interactive 3D electronic representation (e.g. rotation and position) provided by a user or estimated via the geometric reconstruction framework, identified surfaces and/or other contents may be spatially localized in 3D to determine their relative position in the physical scene. In some embodiments, the interactive 3D electronic representation may be estimated by a machine learning model that is trained to predict an interactive 3D electronic representation from a collection of images or video frames with associated camera information (e.g. intrinsics and extrinsics). The interactive 3D electronic representation may be computed using a depth scanning device. The interactive 3D electronic representation may be a CAD design from an external database or provided by a user, for example. In some embodiments, the interactive 3D electronic representation may be input to a machine learning model to identify and localize surfaces and/or contents in a physical scene at a location. In some embodiments, a user may inspect the interactive 3D electronic representation and/or adjust the interactive 3D electronic representation as described below.

The one or more interactive 3D electronic representations are optimized based on a required computing capability and a maximum allowable processing time to minimize overall computing resources and processing time for the interactive 3D electronic representation. For example, optimization may include determining a number of different stages, which type of model (e.g., a classification algorithm, a neural network, etc.) to use for a given stage, how a given model should be trained (e.g., which data should be used to train that stage). Optimization may include determining how much data should be gathered to train the machine learning model; determining which neural network architecture produces the best results; determining which cost function should be used for training the model; determining how to split available data into training data, testing data, validation data, etc.; determining how to artificially augment the data, for example, in a case where data collected/available for any given category is small/not enough to train the model; determining how to minimize the confusion/maximize distinction between categories with similar attributes; etc.

Receiving component 108 may be configured to receive description data of a physical scene (e.g., a room) at a location (e.g., a user's house). The description data may be captured by a user computing platform 104 and/or other devices, for example. In some embodiments, description data comprises one or more images of the physical scene, and the one or more images are generated via a camera associated with a user. In some embodiments, the description data comprises one or more media types. The one or more media types comprise at least one or more of video data, image data, audio data, text data, user interface/display data, and/or sensor data. In some embodiments, the description data is time stamped, geo stamped, user stamped, and/or annotated in other ways.

The description data may be obtained by one or more of a camera, a computer vision device, an inertial measurement unit, a depth sensor, and/or other sensors. In some embodiments, the description data includes data generated by video and/or image acquisition devices, and/or voice recording devices, a user interface, and/or any combination thereof. In some embodiments, the description data is generated via a user interface (e.g., of a user computing platform 104), an environment sensor (e.g., that is part of a user computing platform 104 and/or other computing systems), an external location information database (e.g., included in external resources 124), and/or other sources of information. The data may be generated responsive to a user request, and/or automatically by the system (e.g., without initiation by a user). In some embodiments, the description data is captured by a mobile computing device (e.g., a user computing platform 104) associated with a user and transmitted to one or more processors 128 (e.g., receiving component 108) with or without user interaction.

In some embodiments, receiving description data comprises receiving sensor data from one or more environment sensors. The one or more environment sensors comprise a global positioning system (GPS) sensor, an accelerometer, a gyroscope, a barometer, a microphone, a depth sensor, and/or other sensors.

The received description data provides a description of the physical scene at the location (e.g., description data). The description data may include interior and/or exterior information about the location, and/or other information. Receiving component 108 may be configured such that graphical user interfaces, such as those provided by native applications on mobile devices or browser applications (e.g., by computing platforms 104), may be controlled to enable interactive instructions for the user during a description data (e.g., video) capture process. These graphical user interfaces (controlled by receiving component 108) can also enable a user to provide further text, audio, image, and video data in support of the captured images and videos. Data from additional sensors, including GPS, accelerometers, gyroscopes, barometers, depth sensors, microphones, and/or other sensors, can also be used for capturing properties of the surrounding environment.

By way of a non-limiting example, a user (and/or system 100 without the user) can use cameras, user interfaces, environmental sensors, external information databases, and/or other sources to acquire data about a location, and its contents and structures. The information collected can subsequently be input to automated processes (e.g., the one or more machine learning models and processor functionality described herein) for further identifying surfaces, contents, structures, etc.

One example method of data capture involves capturing video recordings. These recordings may be processed (e.g., by the one or more electronic models and/or components 108-112) in real time during the capture or captured in advance and processed at some later point in time. During a real time video capture, a graphical user interface (e.g., controlled by receiving component 108 and presented by a computing platform 104 associated with the user) can provide interactive instructions to the user to guide them through the process. The one or more electronic models (e.g., a machine learning model) and/or processing components processing the real time video stream can identify if certain surfaces, contents, or structures require additional captures by the user. When this occurs, the user may be immediately prompted to capture additional images or videos of specific aspects of the physical scene. When a user captures a video in advance and later uploads it to a server through the graphical user interface, it can subsequently be processed by the same electronic (machine learning) model (s) to obtain an inventory of identified surface, contents, and structures, for the location. Audio and other sensor data may be captured by the user as well, providing more context for the image and video recordings. The same data capture flow may be used when a user captures a collection of still images of the physical scene, including general images of the physical scene as well as close ups of surfaces and/or other items of interest that might be necessary. Additionally, the real time video stream capture format may be incorporated as part of a collaborative process with an insurance representative who can provide interactive guidance to the user through a graphical user interface, for example.

In some embodiments, a graphical user interface for interactively capturing the physical scene at the location through images and video with visual feedback may be provided by receiving component 108 via a user computing platform 104 to a user, for example. The feedback may include, but is not limited to, real-time information about a status of the interactive 3D electronic representation being constructed, natural language instructions to a user, or audio or visual indicators of information being added to the interactive 3D electronic representation. The graphical user interface also enables a user to pause and resume data capture within the location. Accordingly, the interactive 3D electronic representation may be updated upon receiving additional data related to the location.

Generating component 110 is configured to generate, with a trained machine learning model, the interactive 3D representation of the physical scene based on the description data and/or other information. The interactive three dimensional representation comprises data items corresponding to surfaces and/or contents in the physical scene, and/or other information. The interactive 3D representation comprises a textured or untextured three-dimensional mesh with vertices connected by edges, defining triangular or quadrilateral planar faces. The vertices and the faces each separately comprise position, color, and/or surface normal information.

In some embodiments, generating the interactive 3D representation of the physical scene comprises rendering a mesh for manipulation by the user in a browser (running on a user computing platform 104) with limited computing resources, such that artifacts that are no longer being actively used are disposed of, those artifacts that can be reused are stored, and new artifacts are added only as needed.

Artifacts may comprise metadata associated with mesh faces. For example, artifacts may comprise metadata related to hundreds of thousands of faces (e.g., triangles) on the mesh. Knowing which faces are selected and not selected or which faces are classified as one object or another in the physical scene requires manipulation of large arrays of data in real-time. As another example, a user may select a collection of mesh faces with a brush selection tool (a radius cursor), the system then must instantly access these hundreds of thousands of faces (which have unique identifications) and determine whether they are within the brush selection tool's radius of the specific X, Y coordinate of a user's singular click. If they are, then the system has to determine whether they were previously selected. If a user moves a selection tool back over a space, the system is configured not to "reselect" that face.

Generating component 110 is also configured to extract the data items (e.g., surfaces and/or contents of a physical scene) from the interactive three dimensional representation with the trained machine learning model, and determine attributes of the data items. The attributes comprise dimensions and/or locations of the surfaces and/or contents of the physical scene. In some embodiments, extracting the data items includes providing the interactive 3D representation as an input to the trained machine learning model to identify the data items. For example, the trained machine learning model may comprise a convolutional neural network (CNN) and may be trained to identify objects and structures in multiple physical scenes as the data items. In some embodiments, generating component 110 is configured to identify a subset of the data items with the trained machine learning model. The subset of the data items may comprise a ceiling, a floor, and walls of the physical scene.

One or more machine learning models may work cooperatively to generate an interactive 3D representation. For example, in an embodiment, a first machine learning model may be configured to generate the interactive 3D representation, a second machine learning model may be trained to generate semantic segmentation or instance segmentation information or object detections from a given input image, a third machine learning model may be configured to estimate pose information associated with a given input image, and a fourth machine learning model may be configured to spatially localize metadata to an input image or an input 3D model (e.g., generated by the first machine learning model). In another embodiment, a first machine learning model may be configured to generate the interactive 3D representation, a second machine learning model may be trained to generate semantic segmentation or instance segmentation information or object detections from a given input 3D model or images, a third machine learning model may be configured to spatially localize metadata to an input 3D model or images. In an embodiment, two or more of the machine learning models may be combined into a single machine learning model by training the single machine learning model accordingly. In the present disclosure, a machine learning model may not be identified by specific reference numbers like "first," "second," "third," and so on, but the purpose of each machine learning model will be clear from the description and the context discussed herein. Accordingly, a person of ordinary skill in the art may modify or combine one or more machine learning models to achieve the effects discussed herein. Also, although some features may be achieved by a machine learning model, alternatively, an empirical model, an optimization routine, a mathematical equation (e.g., geometry-based), etc. may be used.

In an embodiment, a system or a method may be configured to generate the interactive 3D representation of the physical scene at the location with spatially localized information of elements within the location being embedded in the interactive 3D representation. For example, in an embodiment of a trained machine learning model (AI) (e.g., processors 128 shown in FIG. 1 and/or the one or more electronic (machine learning) models described herein), may include natural language processing algorithms, machine learning algorithms, neural networks, regression algorithms, and/or other artificial intelligence algorithms and electronic models. Description data such as video or audio (e.g., provided by a user such as a consumer) may be divided into smaller segments (units) using spatial, and/or temporal constraints as well as other data such as context data. For example, a video may be divided into multiple frames and poor quality images with low lighting and/or high blur may be filtered out. Similarly, an audio input may filter out segments comprising background noise and create units of audio where a speaker (e.g., the consumer) is actively communicating.

A neural network (e.g., convolutional and/or recurrent) may be based on a large collection of neural units (or artificial neurons). The one or more neural networks may loosely mimic the manner in which a biological brain works (e.g., via large clusters of biological neurons connected by axons). Each neural unit of a neural network may be connected with many other neural units of the neural network. Such connections may be enforcing or inhibitory in their effect on the activation state of connected neural units. In an embodiment, each individual neural unit may have a summation function that combines the values of all its inputs together. In an embodiment, each connection (or the neural unit itself) may have a threshold function such that a signal must surpass the threshold before it is allowed to propagate to other neural units. These neural network systems may be self-learning and trained, rather than explicitly programmed, and can perform significantly better in certain areas of problem solving, as compared to traditional computer programs. In an embodiment, the one or more neural networks may include multiple layers (e.g., where a signal path traverses from front layers to back layers). In an embodiment, back propagation techniques may be utilized by the neural networks, where forward stimulation is used to reset weights on the "front" neural units. In an embodiment, stimulation and inhibition for the one or more neural networks may be freer flowing, with connections interacting in a more chaotic and complex fashion. In an embodiment, the intermediate layers of the one or more neural networks include one or more convolutional layers, one or more recurrent layers, and/or other layers.

The one or more neural networks may be trained (i.e., whose parameters are determined) using a set of training data. The training data may include a set of training samples. Each sample may be a pair comprising an input object (typically a vector, which may be called a feature vector) and a desired output value (also called the supervisory signal)—e.g., an input-output pair. As described above, training inputs may be images, annotations, and/or other information, for example. A training algorithm analyzes the training data and adjusts the behavior of the neural network by adjusting the parameters (e.g., weights of one or more layers) of the neural network based on the training data. For example, given a set of N training samples of the form $\{(x_1, y_1), (x_2, y_2), \ldots, (x_N, y_N)\}$ such that $x_i$ is the feature vector of the i-th example and $y_i$ is its supervisory signal, a training algorithm seeks a neural network g: X→Y, where X is the input space and Y is the output space. A feature vector is an n-dimensional vector of numerical features that represent some object (e.g., an image of a room with objects to be moved as in the example above). The vector space associated with these vectors is often called the feature space. After training, the neural network may be used for making predictions using new samples (e.g., images of different rooms).

Figure 2:
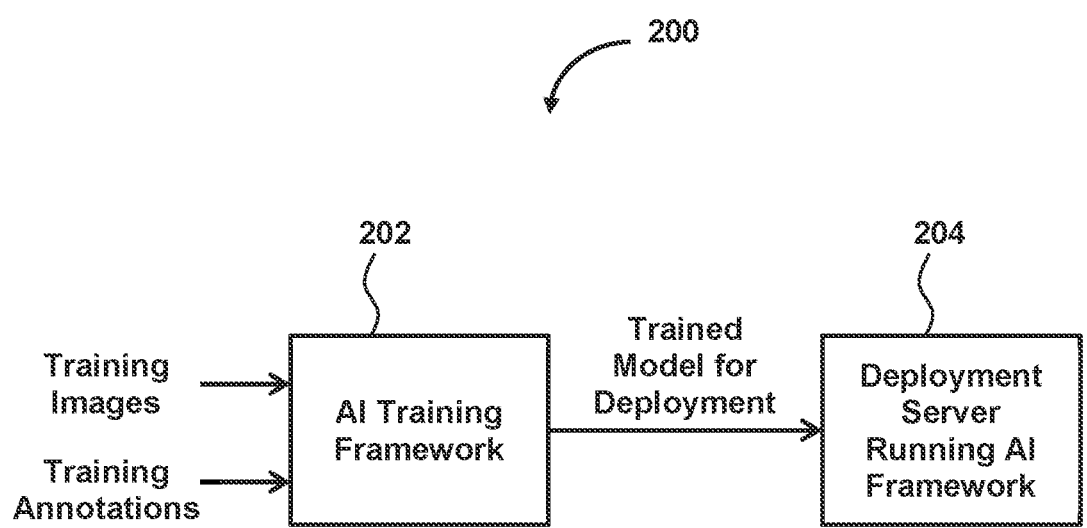
FIG. 2 illustrates an artificial intelligence (AI) (e.g., one or more electronic machine learning models) model that may be trained to recognize surfaces and/or contents in a physical scene at a location, and generate the interactive 3D representation, in accordance with one or more embodiments.

FIG. 2 illustrates an artificial intelligence (AI) (e.g., one or more electronic machine learning models) model 200 that may be trained to recognize surfaces and/or contents in a physical scene at a location, and generate an interactive 3D representation, in accordance with one or more embodiments. Model 200 may form some or all of generating component 110 (FIG. 1), for example. Model 200 may be trained with training data. The training data may comprise input output training pairs associated with each potential data item (e.g., surfaces and/or contents in a physical scene). Model 200 (e.g., a machine learning model) may be trained by obtaining physical scene data associated with a specified physical scene at the location (where the physical scene data includes an image, a video or a three dimensional digital model associated with the specified physical scene); and training model 200 with the physical scene data to predict a specified set of surfaces and/or contents in the specified physical scene such that a cost function that is indicative of a difference between a reference set of surfaces and/or contents and the specified set of contents is minimized. Trained model 200 is configured to predict spatial localization data of the data items. The spatial localization data corresponds to location information of the surfaces and/or contents in the physical scene.

For example, multiple training images with surfaces, contents, etc. that need to be detected may be presented to an artificial intelligence (AI) framework 202 for training. Training images may contain surfaces such as walls, ceilings, floors, and or other information. Each of the training images may have annotations (e.g., location of surfaces in the image, coordinates, and/or other annotations) and/or pixel wise classification for contents, walls, floors, ceilings, and/or other surfaces, and/or other training images. Responsive to training being complete, the trained model (and/or one or more trained models) may be sent to a deployment server 204 (e.g., server 102 shown in FIG. 1) running a machine learning (e.g., AI) framework. It should be noted that training data is not limited to images and may include different types of input such as audio input (e.g., voice, sounds, etc.), user entries and/or selections made via a user interface, scans and/or other input of textual information, and/or other training data. The models, based on such training, be configured to recognize voice commands and/or input, textual input, etc.

Deployment server 204 may be a standalone server and/or a module that may be deployed as part of an app in a user's smartphone, tablet, and/or other personal computing device, in accordance with one or more embodiments.

Returning to FIG. 1, verification component 112 is configured to cause interactive human verification (if needed) of the attributes of the subset of data items. The verification comprises receiving user selection of the ceiling, the floor, or a wall, and flattening a view of the selected ceiling, floor, or wall from the interactive 3D representation to two dimensions. Flattening the view of the selected ceiling, floor, or wall from the interactive three dimensional representation to two dimensions comprises flattening a height or depth dimension in the view of the selected ceiling, floor, or wall, and forcing additional input form a user into a plane formed by the selected ceiling, floor, or wall.

The verification comprises receiving user adjustments to the dimensions and/or locations of the selected ceiling, floor, or wall. The verification comprises receiving user indications of cut outs in the selected ceiling, floor, or wall, a cut out comprising a window, a door, or a vent in the selected ceiling, floor, or wall. A cut out comprises a window, a door, or a vent in a selected ceiling, floor, or wall. Verification may include determining point to point measurements in the interactive three dimensional representation, determining area measurements of one or more data items, and/or receiving user annotations related to one or more of the data items. In some embodiments, verification may include moving a view of the physical scene in the interactive three dimensional electronic representation to match a position and field of view of a user's device that was used to obtain the description data by applying a background blur while moving the view. The verification comprises updating, with the trained machine learning model, the interactive 3D representation based on adjustments to the dimensions and/or locations, and/or the indications of cut outs for continued display an manipulation in the browser.

In some embodiments, a graphical user interface may be provided for displaying and interacting with the interactive 3D representation of the physical scene and its associated information. The graphical user interface may be presented in a browser running on a user computing platform 104, for example. The graphical user interface provides multiple capabilities for users to view, edit, augment, and otherwise modify the interactive 3D representation and its associated information. The graphical user interface enables additional information to be spatially associated within a context of the interactive 3D representation. This additional information may be in the form of semantic or instance annotations; 3D shapes such as parametric primitives including, but not limited to, cuboids, spheres, cylinders and CAD models; and audio, visual, or natural language notes, annotations, and comments or replies thereto. The graphical user interface further enables a user to review previously captured scenes, merge captured scenes, add new images and videos to a scene, and mark out a floor plan of a scene, among other capabilities.

The following descriptions of the various figures provide several non-limiting examples of the functionality of verification component 112 and/or additional aspects of one or more other components of system 100 shown in FIG. 1, and/or the operations performed by these components.

Figure 3:
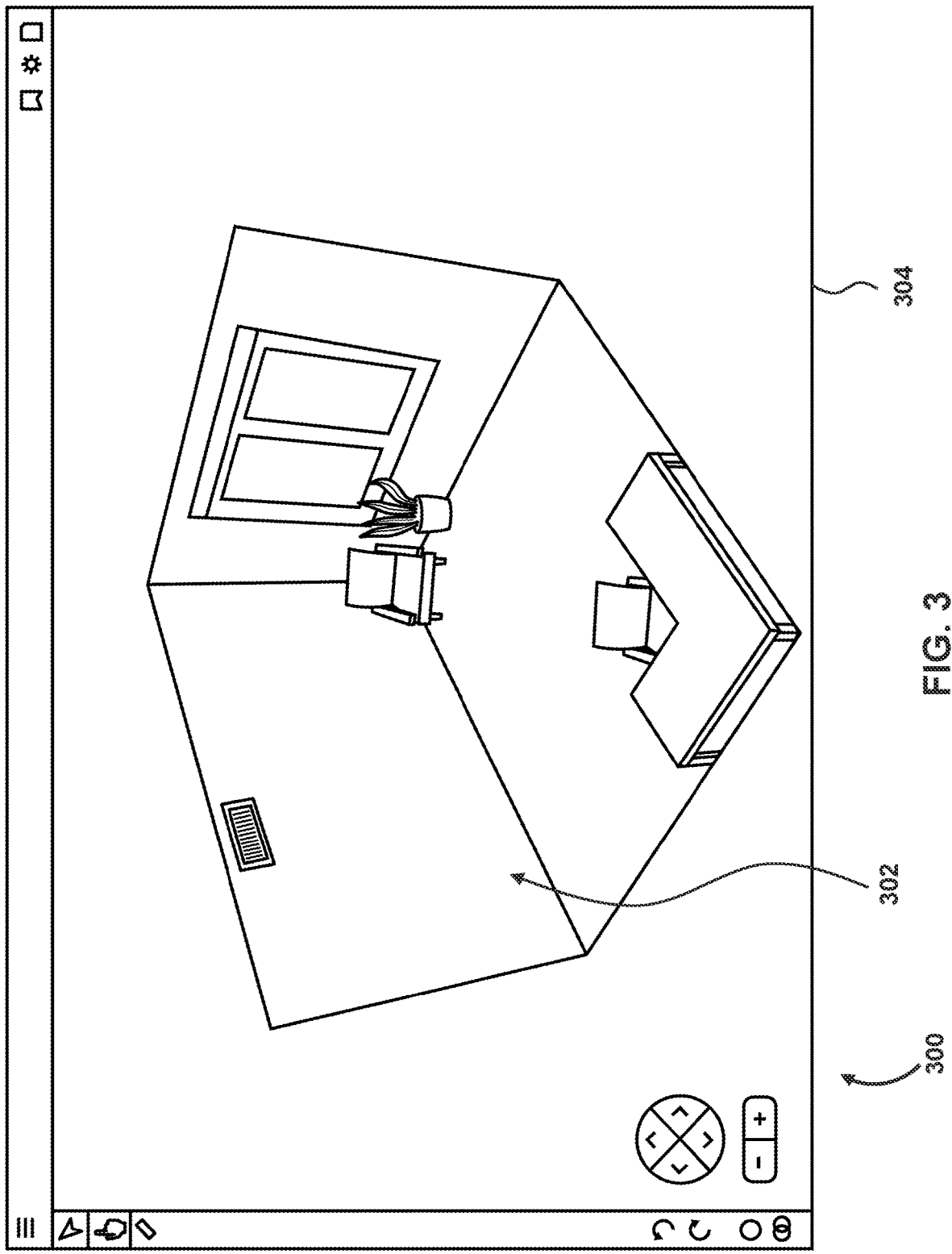
FIG. 3 illustrates an example of a view of an interactive 3D representation of a physical scene (e.g. a room) at a location (e.g., a house) in a browser, in accordance with one or more embodiments.

FIG. 3 illustrates an example of a view 300 of an interactive 3D representation 302 of a physical scene (e.g. a room) at a location (e.g., a house) in a browser 304. Interactive 3D representation 302 may be output by generating component 110 shown in FIG. 1, for example. Interactive 3D representation 302 may comprise a representation of detected surfaces (e.g., the mesh described above) in a document object model (DOM) loaded in a desktop or mobile browser 304. As described above, the mesh comprises thousands of small triangles (faces) that have been detected by generating component 110. No additional software, plug ins, or extensions are required to be installed on a user's computing device (e.g., user computing platform 104 shown in FIG. 1) because view 300 is presented in browser 304 on the user's computing device. Key to successful rendering of representation 302 in browser 304 is efficient resource management and timely disposal of artifacts (methods, objects, or other) that are no longer being actively used, storing those that may be reused intelligently, and adding new artifacts only as needed.

Figure 4:
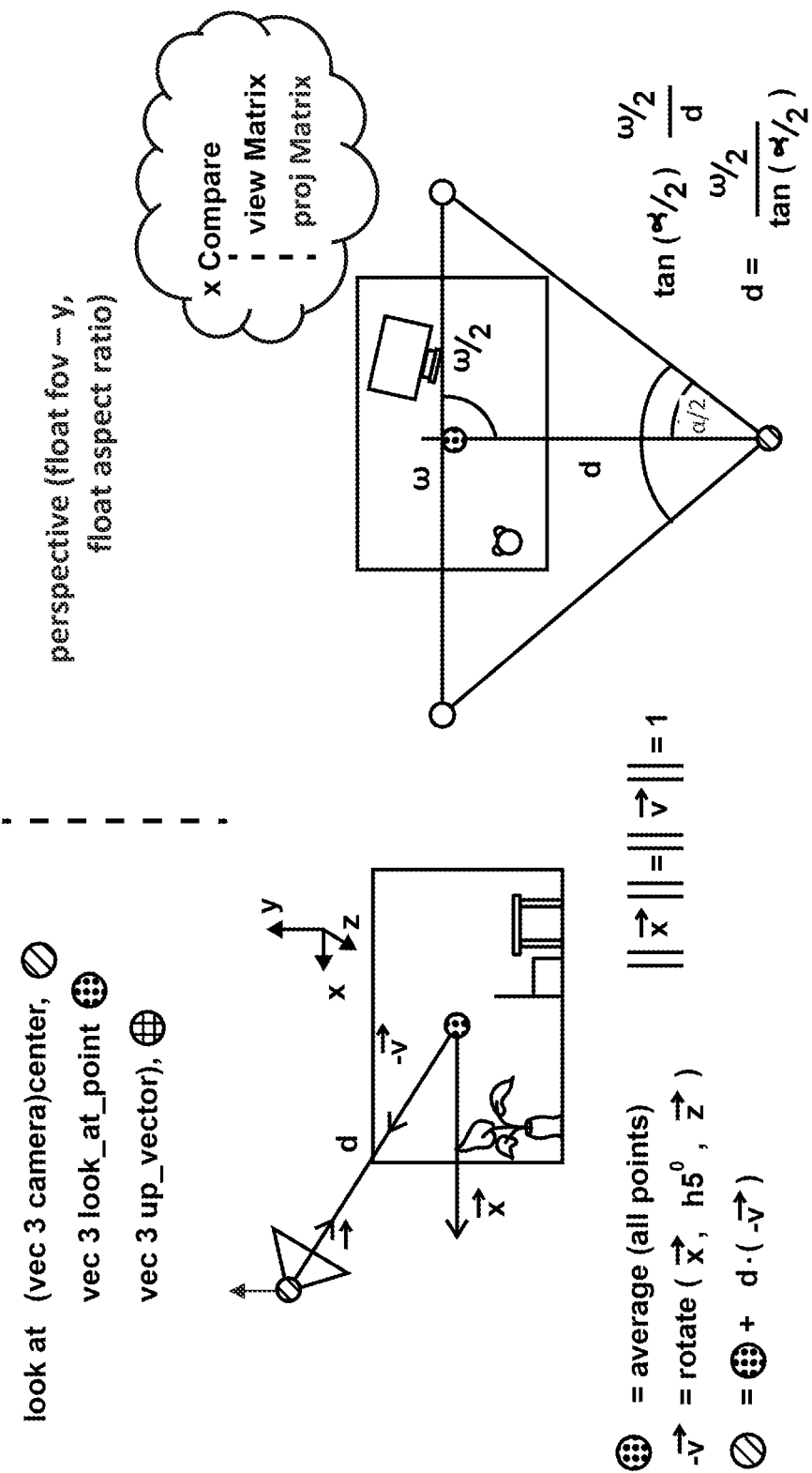
FIG. 4 illustrates mathematics associated with a user perspective of an interactive 3D representation, in accordance with one or more embodiments.

Interacting with interactive 3D representation 302 in a 2D space on a computer screen is not intuitive to most users who have not experienced complex 3D world environments in video games, for example. Interactive 3D representation 302 is configured to be used intuitively by any user because interactive 3D representation 302 provides an ability to easily move an look around interactive 3D representation 302. In some embodiments, interactive 3D representation 302 is configured such that a user sees and interacts with interactive 3D representation 302 from an intelligently placed initial camera position (resulting in view 300). This initial camera position may show the user a perspective of an entire area of the physical scene represented by interactive 3D representation 302, with a zoom (camera radius) configured to fit a current viewport size of the document object model. View 300 is tilted (camera alpha) to show the user perspective of interactive 3D representation 302 and convey three dimensions. Mathematics associated with this user perspective are shown in FIG. 4.

Figure 5:
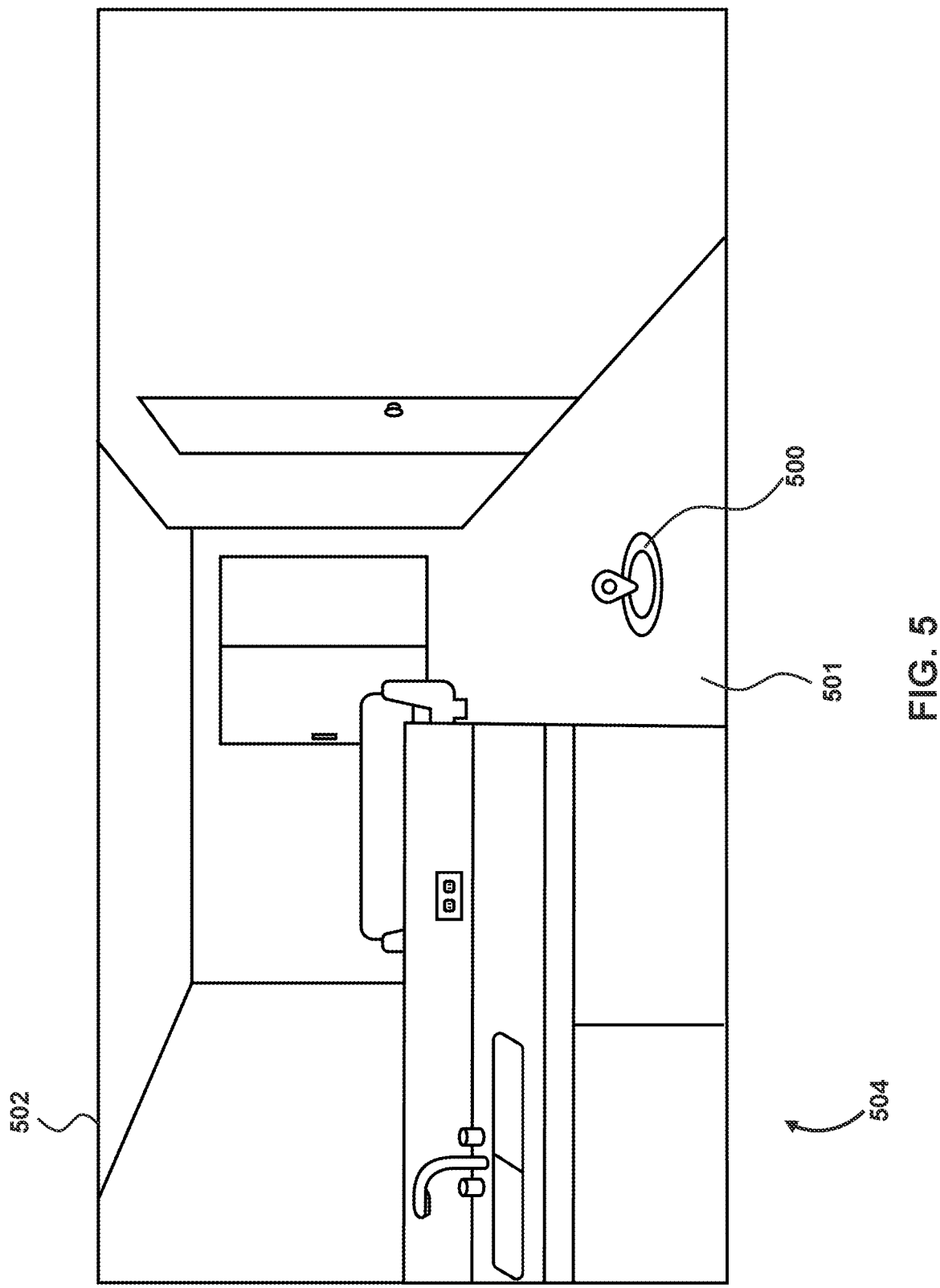
FIG. 5 illustrates how a user may click on a floor of an interactive 3D representation, which moves a view of the interactive 3D representation to a point that simulates a user's view of the physical scene if the user was standing on the clicked location, in accordance with one or more embodiments.
Figure 6:
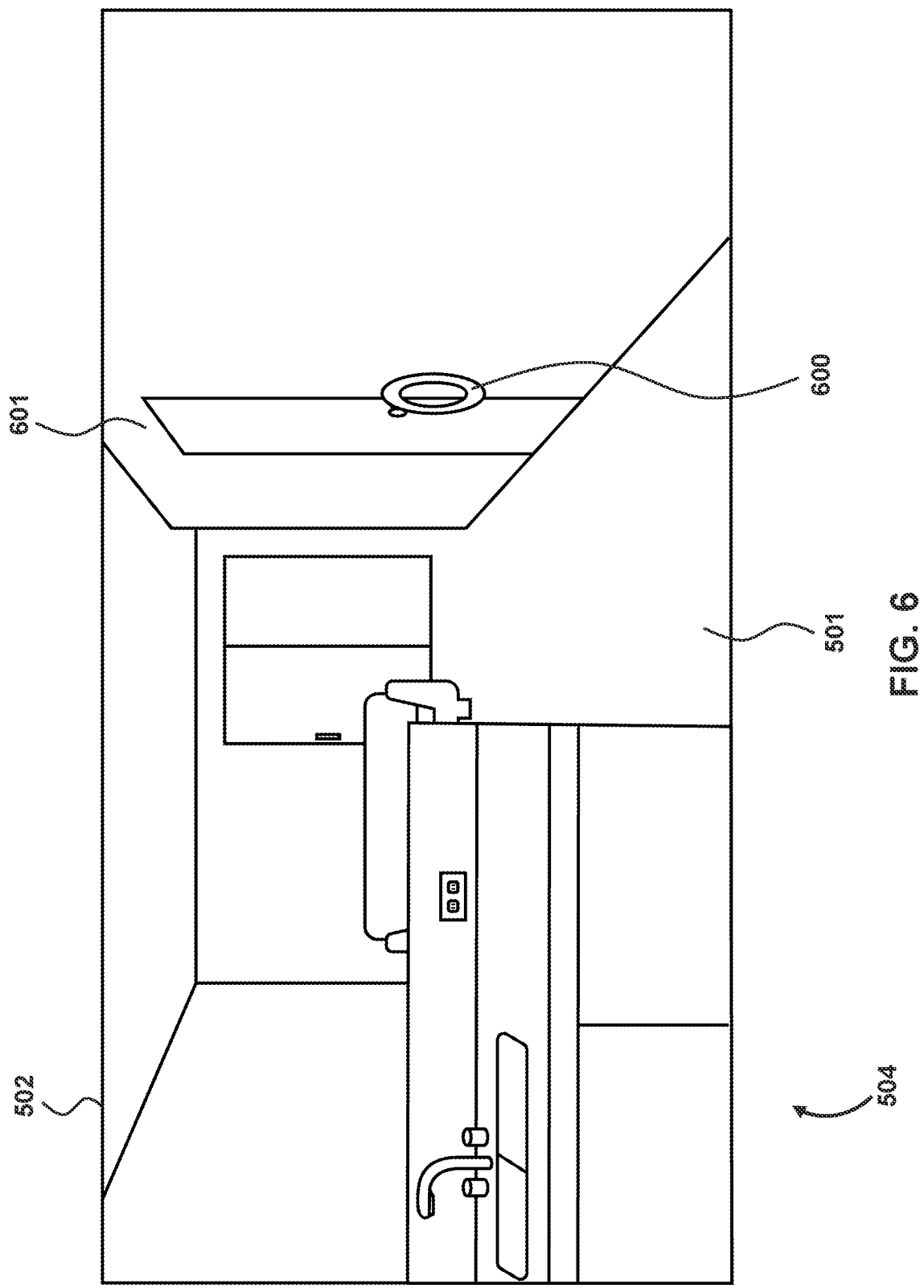
FIG. 6 illustrates how a user may click on a wall of the interactive 3D representation of FIG. 5, which moves the view of the interactive 3D representation to a point that simulates a user's view of the physical scene if the user was looking at the clicked location, in accordance with one or more embodiments.

View 300 can be manipulated by a user via mouse and/or other browser 304 interactions which change a user's perspective of interactive 3D representation 302. For example, FIG. 5 illustrates how a user may click 500 on a floor 501 of an interactive 3D representation 502, which moves a view 504 of interactive 3D representation 502 to a point that simulates a user's view of the physical scene if the user was standing on the clicked location. If a user clicks on a wall or other object of interactive 3D representation 502, view 504 is set at that point clicked with a position and radius scaled towards the point clicked, resulting in a zoomed in effect. The resulting view movements simulate the user walking towards the clicked point. With each additional click on the same point, the position and radius continue to scale to a minimum point so as to prevent a user from "over-zooming". If a user clicks on a wall or other object that is less than a certain distance from the current view 504 position, the view 504 position does not change, rather only the view target changes, resulting in a view pan effect that simulates a user turning their head, but not moving their body. For example, FIG. 6 illustrates how a user may click 600 on a wall 601 of interactive 3D representation 502, which moves view 504 of interactive 3D representation 502 to a point that simulates a user's view of the physical scene if the user was looking at the clicked location.

Responsive to a user moving a mouse and hovering over a certain location in interactive 3D representation 502, a cursor may be configured to change shape depending on whether a view of interactive 3D representation 502 will "move" to that point, or if the view will "zoom and position" to that point. Note that the present system can also be configured such that a view of interactive 3D representation 502 can be manipulated with touch interfaces natural to standard touch controls. For example, a pinch in or out may correspondingly change a zoom level of the view. Double tapping, directional buttons, keyboard interfaces, voice commands, virtual reality input, and/or other control mechanisms are also contemplated.

In some embodiments, verification component 112 shown in FIG. 1 may be configured to allow a user to interact with an interactive 3D representation to measure and/or verify distances, selected areas, and/or other dimensions in a physical scene (e.g., in a room). The present lightweight browser-based application (provide by system 100 shown in FIG. 1) accomplishes this in a natural and intuitive way.

To make an accurate measurement of a feature in an interactive 3D representation, a user first moves a view of the interactive 3D representation to include the feature of interest. Once the user has navigated to the feature, system 100 and verification component 112 (FIG. 1) may be configured to allow the user to select a measurement tool displayed on a side of the browser screen and use the tool to select a point the user wishes to measure from. The user may then click a second point and verification component 112 draws a line between these two points and calculates the distance between the points. If a user selects a third, fourth, fifth, etc., point, a polygon is created. For a polygon, an area inside the polygon may be determined. The user can label the name of any measurement or polygon for future reference. Measurements and polygons can also be deleted and/or viewed in a report builder popup modal, and/or other browser features.

For a distance measurement (two points selected), the distance between the two points may be labeled in the center of the two points, according to the equation:

$$(x_m, y_m) = \left(\frac{x_1 + x_2}{2}, \frac{y_1 + y_2}{2}\right).$$

For an area of a polygon (three or more points selected), the area of the space created inside the points may be labeled at the centroid of all points, according to the equation:

$$A = \frac{1}{2} \sum_{i=0}^{n-1} |x_i y_{i+1} - x_{i+1} y_i|.$$

Figure 7:
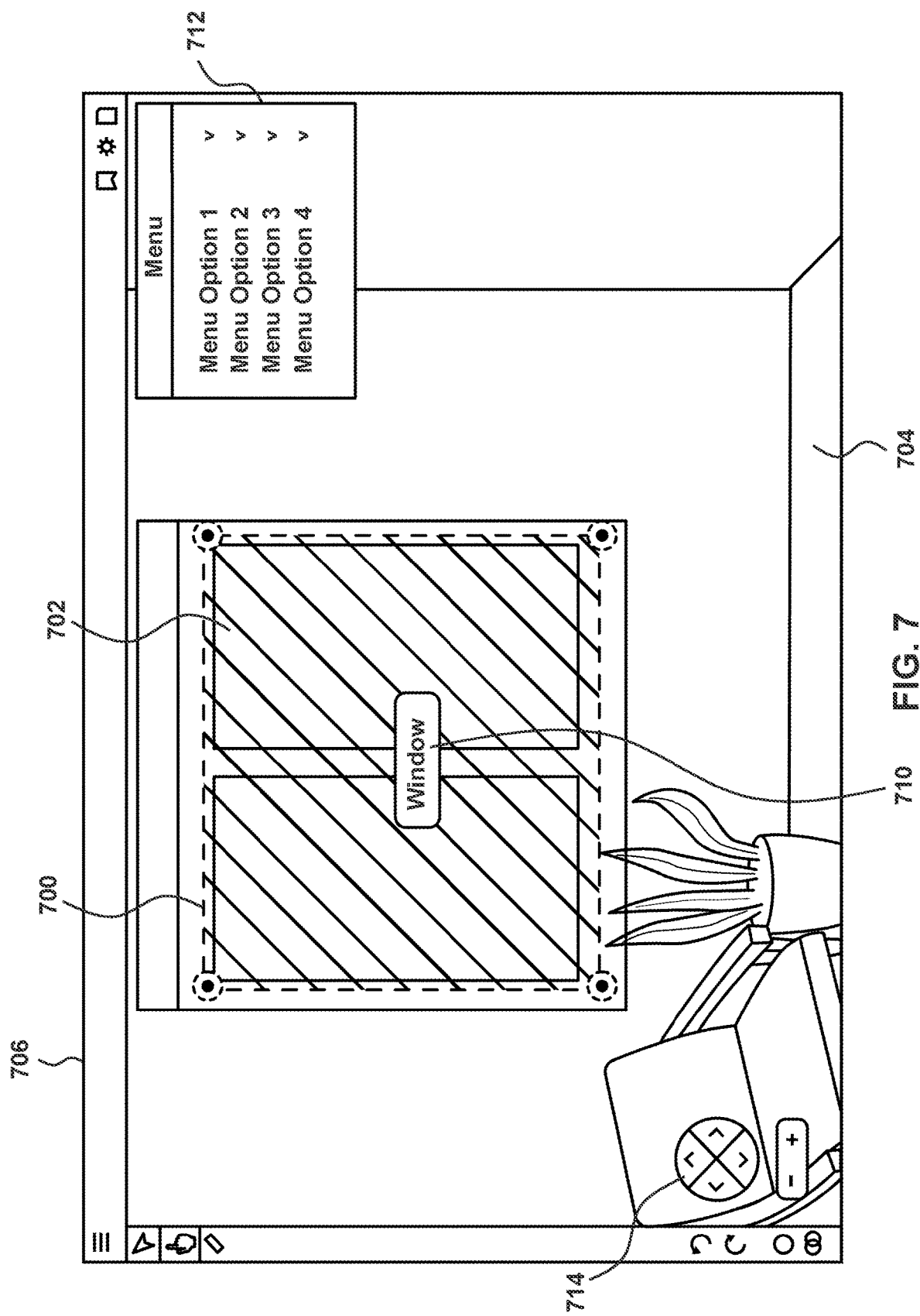
FIG. 7 illustrates user measurement of an area of a window in an interactive 3D representation in a browser, in accordance with one or more embodiments.

FIG. 7 illustrates user measurement of an area 700 of a window 702 in an interactive 3D representation 704 in a browser 706. FIG. 7 also illustrates a label 710 for the name of area 700, a report builder popup modal 712, and navigational control arrows 714, among other features. Advantageously, the present systems and methods are configured such that the user does not have to begin pre-determining that they are going to be making a two point measurement resulting in a distance or a multi-point selection resulting in an area. This is achieved by automatically by the system by simply counting the number of points that the user has clicked on and inferring from that what type of measurement they are trying to achieve. Any measurement or deletion of a measurement can be undone or redone via a command queue, for example.

In some embodiments, system 100 and/or verification component 112 (FIG. 1) may be configured such that if a user finds a location on an interactive 3D representation that is particularly interesting or wants to remember an area, the user can bookmark the view (e.g., a camera position). Bookmarks can be named, moved, and saved into directories with names and groupings, for example.

In some embodiments, system 100 and/or verification component 112 (FIG. 1) may be configured such that a user may hand draw on an interactive 3D representation, such as circling, jotting free form notes, or bringing another user's attention to a particular item of interest. This may include drawing on faces or on a texture of a mesh (described above) itself. With such a tool, a pen-like interface may allow users to draw on the mesh. Drawings may have data on provenance such as time of generation, name of user generating, and/or other data describing the user who made the mark up. Mark ups may also be hidden and toggled on and off with a selection made via the browser.

As described above, verification component 112 (FIG. 1) is configured to cause interactive human verification of the attributes (e.g., dimensions, locations, etc.) of a subset of data items (e.g., floors, walls, ceilings, etc.). The verification comprises receiving user selection of the ceiling, the floor, or a wall (e.g., as described above), and flattening a view of the selected ceiling, floor, or wall from the interactive 3D representation to two dimensions. In some embodiments, verification component 112 is configured to change a view of an interactive 3D representation from a perspective view (3D) to an orthographic view (2D) with a fixed alpha (pitch) to 0. With the fixed Alpha at 0, the view may show an area of interest from the interactive 3D representation from an overhead perspective in the case of a floor surface (and/or other 2D perspectives for walls or ceilings), which has many applications for a user. This 2D mode may still shows a texture of a mesh (described above), though the user's perspective may be limited by fixing the view to be at a pitch to stay directly above the mesh (in this example). Combined with an orthographic view, the 2D mode allows the user to see actual lengths and widths of an area's ceilings, walls, and/or floors, for example, without distortion as would be seen in a perspective view. Each time a view is toggled between 2D or 3D, the view intelligently positions itself to view and contain the entire mesh of the represented area.

Figure 8:
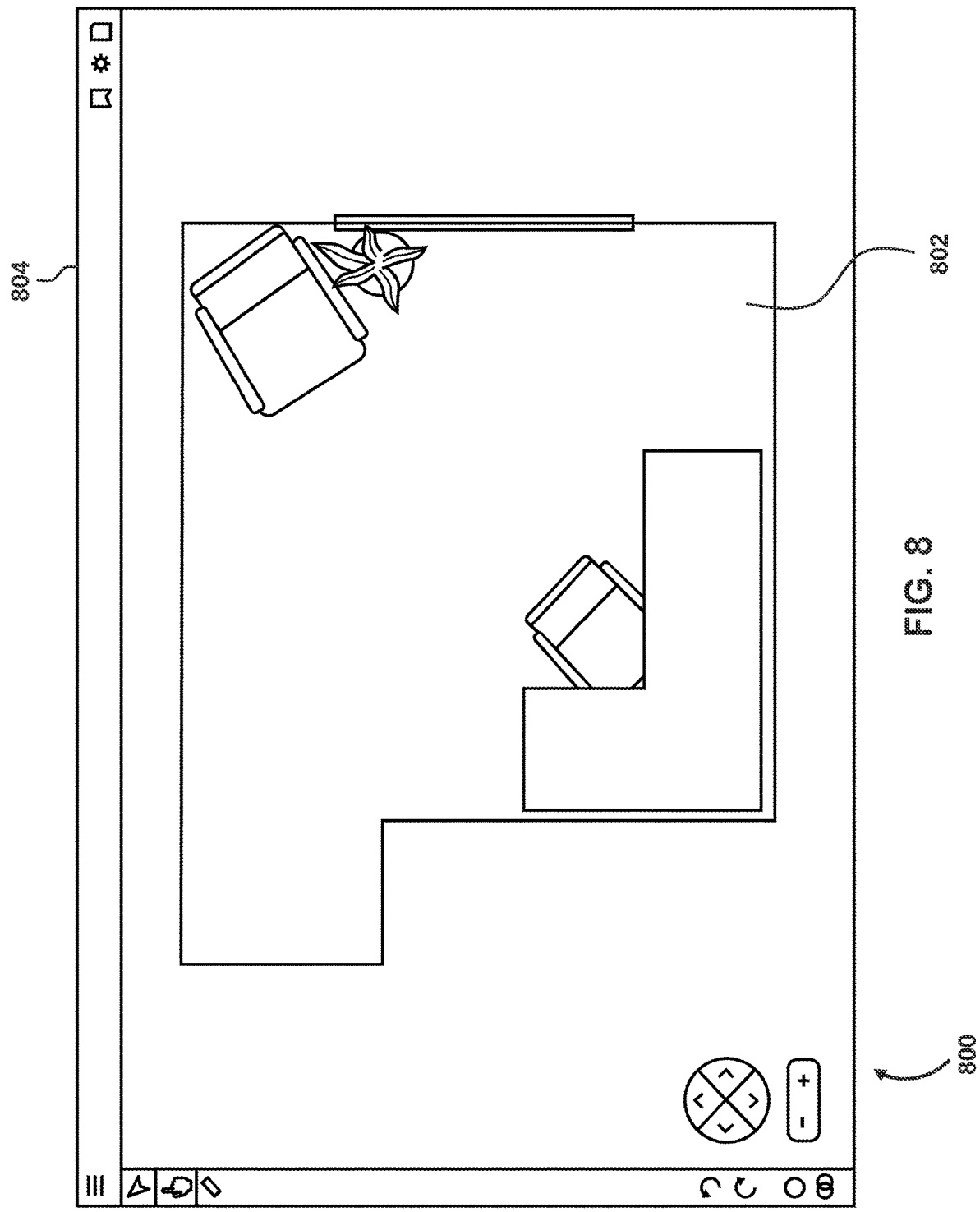
FIG. 8 illustrates a user selected 2D view of a floor in a browser, in accordance with one or more embodiments.

FIG. 8 illustrates a user selected 2D view 800 of a floor 802 in a browser 804. View 800 is a flattened view of the selected floor from a corresponding interactive 3D representation. Verification component 112 (FIG. 1) is configured to change the view of the interactive 3D representation from a perspective view (3D) to an orthographic view (2D—e.g., view 800) with a fixed alpha (pitch) to 0. With the fixed Alpha at 0, view 800 shows an area of interest from the interactive 3D representation from an overhead perspective.

One possible use of a 2D flattened view of a floor surface includes intuitively determining a floor plan of the physical scene, and/or area of the floor of a room of the physical scene. For example, using a 2D view of a floor surface, a user may select the measurement tool described above, and is then able to click on each corner of a room, marking the points (vertices) that make up the area (polygon) of the floor plan of the room. The present systems and methods are configured such that a user can click, drag, and move an already placed vertex to a new location, delete it, or add a new vertex by clicking on a line already drawn between two placed vertices on the floor plan. This new vertex can be dragged and moved around as well.

Figure 9:
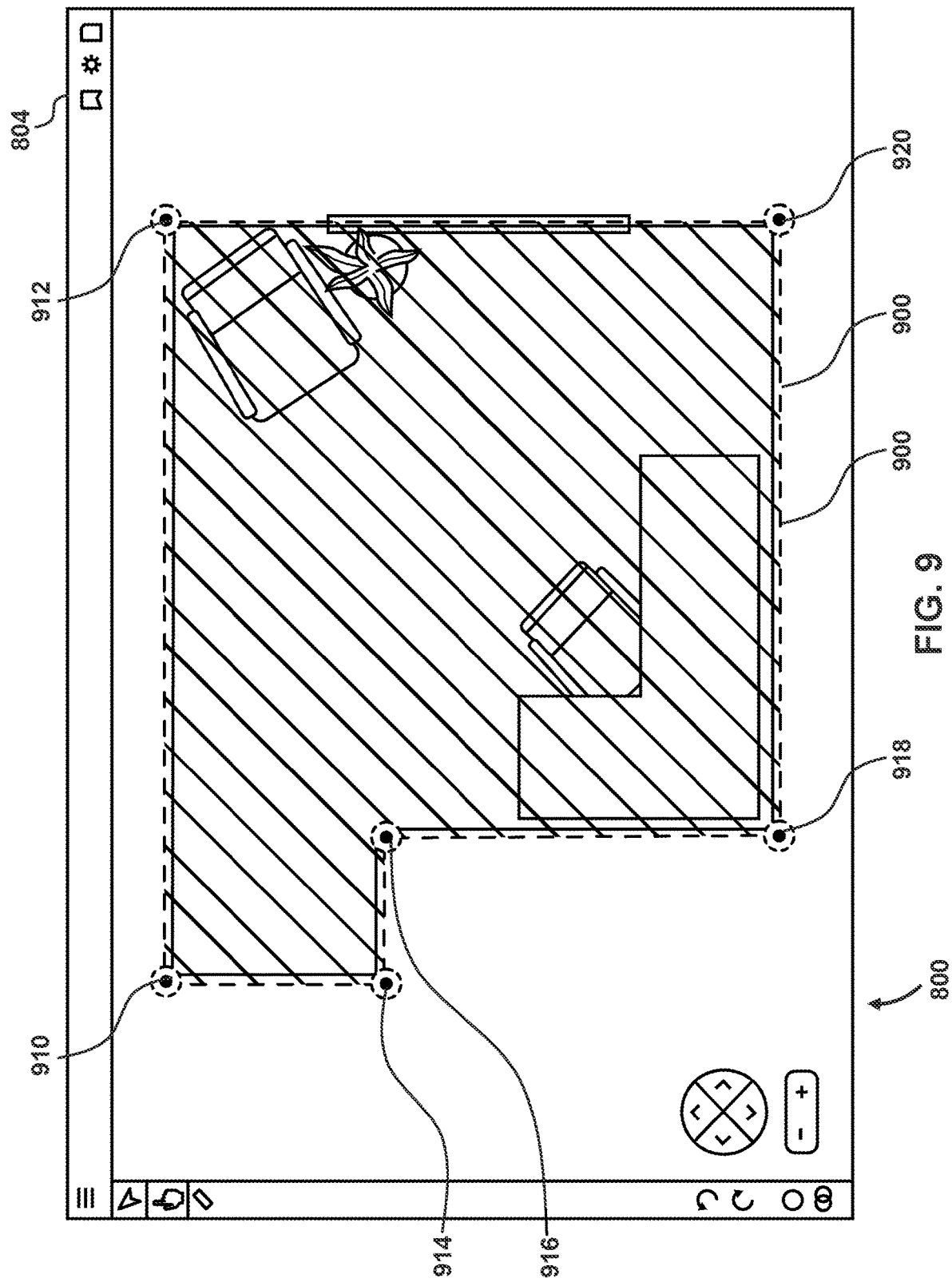
FIG. 9 illustrates determining a floor plan of a physical scene the using user selected 2D view of the floor in the browser shown in FIG. 8, in accordance with one or more embodiments.

FIG. 9 illustrates determining a floor plan 900 of the physical scene using user selected 2D view 800 of floor 802 in browser 804. In FIG. 9, a user has clicked on each corner of a room, marking the points (vertices) 910, 912, 914, 916, 918, and 920 that make up the area (polygon) of floor plan 900 of the room. Any marking of a floor plan 900 vertex 910-920, or deletion of a floor plan 900 vertex 910-920 can be undone or redone via a command queue, for example. Note that floor plan 900 may initially be determined by a machine learning model (described above). The initial floor plan can then be deleted, edited, or manually entered as outlined above for any number of reasons including: AI Error, unique characteristics of a room, marking out different floor types in the same room (e.g., hardwood and tile in the same space), etc.

In some embodiments, an area of a floor plan drawn may be shown at or near the middle of the floor plan polygon drawn. In the case of irregular shapes such as the floor plan of the room shown in FIG. 9, a bounding box may be drawn using minX, minY, maxX, and maxY values. The centroid of this bounding box may then be where the location of an area label is drawn.

In some embodiments, an opacity of a floor plan polygon can be set using a slider (and/or any other appropriate controller) that is visible in the browser. In this example, sliding to the left may make a colored area shade of the floor plan polygon fade away, while sliding to the right makes the colored area shade darker.

Figure 10:
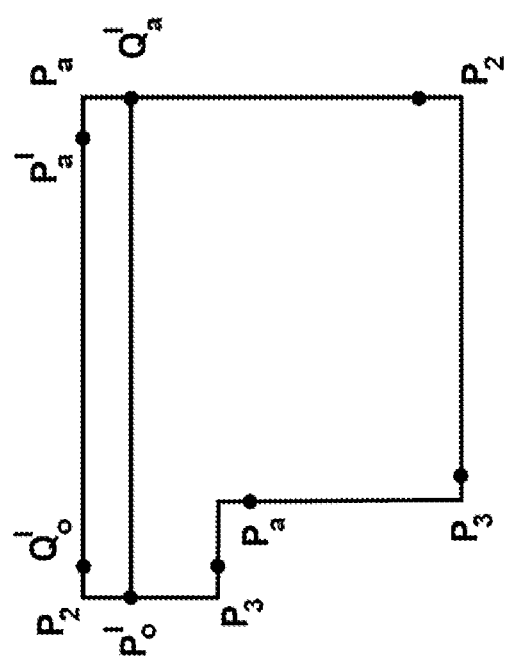
FIG. 10 illustrates an example of mathematics associated with length calculations for each wall in a floor plan polygon, in accordance with one or more embodiments.

In some embodiments, along each side of a floor plan polygon (along each wall), the system may calculate and labels each wall's length. Example mathematics associated with these length determinations is shown in FIG. 10. Note that FIG. 10 corresponds to FIG. 9 and FIG. 8, and is intended to correspond to one possible example, of many possible shapes.

Distance and area measurements can be changed to metric instead of imperial or potentially integers and quarter units instead of decimals, depending on the user's selected preference, for example. Annotations and notes for a floor plan can be recorded. Example notes may include notes related to wall type (paneled, drywall, other), paint type, wall integrity (smooth, imperfect, damaged), etc. In some embodiments, other characteristics of a wall can be marked on a floor plan such as location of studs, wall mounted televisions, location of communication ports (coaxial, telephone, ethernet), etc. In some embodiments, other items of note can be marked on a floor plan such as: openings (e.g. windows, doors, thresholds, pass-throughs), electrical (e.g. outlets, switches, junction boxes), plumbing (e.g. faucets, pipes, toilet, shower, hose bibbs), thermostats, supply registers, toe kick supply line registers, aligned face of finish, symbols/abbreviations/other references to related schedules, etc.

Similar methodologies (e.g., similar to the methodologies for floors as described above) may can be applied to a ceiling, walls, and/or other surfaces in the physical scene. Features of interest on a ceiling that could be noted include skylights, ceiling fans, recessed lighting, chandeliers, smoke or carbon monoxide detectors, home alarm systems, doorbells, or other features of note on the ceiling. Features of interest in walls may include doors, windows, vents, etc.

In some embodiments, verification component 112 (FIG. 1) may be configured to capture, along with any floor plan, ceiling, wall, or other marked measurements, related schedules (tables) (e.g., visible via a modal on a top right corner of a browser screen) for identified electrical components, fixtures, finishes and materials, contents (e.g., such as furniture), and/or other contractor/designer/adjuster notes.

In some embodiments, verification component 112 (FIG. 1) may be configured such that data generated by system 100 (FIG. 1) can be exported both to external applications for further analysis and work, as well as to a downloadable report for documentation and future use. In some embodiments, a display of the browser may be configured such that measurements taken by a user (as described above) show under a measurements display tab. A determined floor plan may be shown under a floor plan display tab. Other information (determined automatically by the machine learning model(s) described above, or manually noted by a user) may be shown under other display tabs as appropriate.

By way of a non-limiting example, a workflow for insurance underwriting inspections is described. Some or all of this workflow may be performed by the one or more processors of system 100 described above and shown in FIG. 1, and/or other components. Additional detail about this or other similar work flows can be found in U.S. patent application Ser. No. 17/194,075 (titled Systems and Methods for Building a Representation of a Location) and Ser. No. 17/193,957 (titled Capacity Optimized Electronic Model Based Prediction of Changing Physical Hazards and Inventory Items), both of which are hereby incorporated by reference in their entireties. A workflow for insurance underwriting inspections may begin when a user uploads a video from their device/smartphone to be processed. This request is received by a system application program interface (API) (e.g., associated with server 102 shown in FIG. 1) which then creates a video document in a database (e.g., electronic storage 126 shown in FIG. 1) and adds a message to a video processing queue. A video processing module (e.g., formed by the one or more processors of system 100) may read this message from the video processing queue and transcode it. Once the video has finished being transcoded, it is uploaded to file storage and a message is sent to a keyframe extraction queue for further processing. A keyframe extraction module (formed by the one or more processors of system 100) reads this message from the keyframe extraction queue and proceeds to create detections (i.e., labeled bounding boxes for structures, contents, and/or hazards) for each of its frames, decides which frames are needed to show a distinct set of these detections, and communicates with the API to store these detections and frames to a database/file storage. A message is then sent from the keyframe extraction service to the video processing queue to postprocess the uploaded detections. The video processing module reads this message from the video processing queue and applies customer-specific properties/modifications to its detections. For example, a detection's volume, weight, and category may be specified, or the detection could be renamed to be more suitable for end users that will be viewing them. This video, along with its keyframes and detections, can then be presented on a website for review.

Detections may be classified into one of three categories: structures, contents, and hazards, for example. Structures include attached/fixed/built-in features of a building (e.g., staircases, countertops, gutters). Contents are movable objects, including heavier items such as large household appliances (e.g., refrigerators, freezers). Hazards can be contents, structures, and properties of either that are risks that could lead to repair/replacement costs. Hazards can also include elements that are not associated with contents or structures, such as environmental conditions (e.g., adjacent to brush, coastal exposure), the presence of dangerous animals, and business exposure (e.g., commercial vehicles at the location).

In a single-model approach, a video may be processed (by the one or more processors of system 100) such that a minimal set of keyframes are extracted in order to present detections of structures, contents, and/or hazards provided by a single object detection model (e.g., a machine learning model as described above) in combination with a detection-based tracker. Video frames are input to the object detection model to output detections, and these detections are associated with one another by the detection-based tracker in order to identify distinct detections across the video. A score for each detection for each frame may be calculated (by the one or more processors of system 100) to determine the best keyframe for viewing each distinct detection. This score can be based on properties as simple as the frame number the detection was made in, or the area of a bounding box for the detection. The keyframes that include the distinct detections are the final set of extracted keyframes for the video.

Multiple models (e.g., multiple machine learning models described above) can be used (by the one or more processors of system 100) to provide improved detections and keyframes. In one example of this approach, one object detection model (keyframe-focused and formed by the one or more processors of system 100) is trained to make a wider variety of detections with the intention of selecting keyframes that better summarize the video, and another object detection model (detection-focused and also formed by the one or more processors of system 100) is trained to optimize the detection of structures, contents, and/or hazards. As in the single-model approach, detection-based tracking is used to capture a set of keyframes and detections for both the keyframe-focused and detection-focused models. The detections from the keyframe-focused model are then discarded, and the detections from the detection-focused model are mapped onto the keyframes from the keyframe-focused model. If a detection from the detection-focused model was not captured in a keyframe from the keyframe-focused model, then the best keyframe for this detection is added to the final set of keyframes, as well as this keyframe's detections. Keyframes from the detection-focused model that contain no unique are discarded as well. This results in a final set of keyframes and detections that are a mix of the two sets of keyframes and detections with the intention of improving video summarization for keyframe selection via detection-based tracking while optimizing the detection of structures, contents, and/or hazards.

Tags can be identified by a machine learning model (utilized by the one or more processors of system 100) in a bounding box with a maxY, minY, maxX, and minX value, for example. The tags are displayed to the user in the centroid of this box. The tags can be hovered over and highlighted as well as dragged around to change the location of the bounding box (and thus centroid) of the tag. If a tag is dragged outside of the bounds of an image it is identified in, the tag can be placed on another image if the tag is dragged to a new image. In this case, the tag is deleted from the image of origin and is added to the destination image. If a tag is dragged to a location that is not on another image or on the image of origin, the move is invalid and the tag bounces back to its original location. A new tag can be added to any location in any image by right clicking and selecting the type of tag to be added. The new tag stamps onto the image. An existing tag can be deleted by right clicking on the tag and selecting to delete it, for example. The tag expands and disappears in an animation.

In some embodiments, verification component 112 (FIG. 1) is configured for automated floor plan generation. To lower the amount of time a back-office adjuster (as one example user) spends on measuring the 3D representation of the physical scene at a location (e.g., as described above), verification component 112 may be configured (in addition to and/or instead of a configuration described above) to provide a solution for estimating a floorplan automatically. An automatically generated floor plan can serve as a starting point for a user such as a back-office adjuster, requiring little to no manual adjustments (e.g., as described above).

Verification component 112 (FIG. 1) may be configured to leverage an automatically generated interactive 3D representation described above for automated floor plan generation. Automated floor plan generation may include detecting physical scene (e.g., floors, ceilings, walls, windows, doors) structures from an input video, transferring detections onto the interactive 3D representation, detecting co-planar regions for wall separation, computation of wall segments within a floor plane, estimation of a floor plan from the wall segments, tessellation of the floor plane using the detected wall segments, classification of each of the cells of the tessellation as floor/not floor, extraction of a floor plan polygon from cells classified as floor, and/or other operations.

Given an input video of a room (for example) captured by the user, verification component 112 (FIG. 1) may perform semantic segmentation of each video frame using a deep neural network. Given a frame from a video, the neural network predicts a per-pixel class index, each of which relates to a different semantic class. The semantic classes predicted include classes for "other", "floor", "wall", and "ceiling", among others. For each image verification component 112 is able to tell which parts of it belong to a floor, wall, ceiling, or neither. The deep neural network may be based on the Swin Transformer architecture, for example, adapted to output per-pixel class indices. In some embodiments, the classification heads of a present network utilize the feature pyramids from the Swin Transformer backbone. The features at each pyramid level are resized to a common resolution via bilinear interpolation and then concatenated hierarchically along the feature dimension, followed by a convolutional layer to reduce the size along the feature dimension. Fused features are then passed to a classification head comprising convolutional layers that output the final per-class label. The deep neural network may be trained using a large semantic segmentation dataset, for example a dataset with ground truth labels of over 10 k images. Note that in future embodiments the list of predicted classes may change.

Verification component 112 (FIG. 1) is configured to cause the deep neural network to predict the semantic classes for input video frames, which are 2D entities. As described above, the interactive 3D representation of the physical scene may comprise a (triangle) mesh, which is a graph data structure storing lists of vertices and a list of indices that indicate which vertices are joined together (as a triangle). Each vertex can be equipped with a number of attributes like position, surface normal vector, semantic class index, etc.

Camera poses and intrinsics (captured alongside the video using a VIO system, like Apple's ARKit or Google's ARCore) are utilized for predictions. The interactive 3D representation and aforementioned camera data allow verification component 112 to project mesh vertices onto a camera image plane. This process facilitates mapping each of the mesh's vertices to the image coordinates and look up a predicted label. If a vertex falls into a region labeled as a semantic class "x", the per-vertex histogram bin for class "x" will be increased by one. A per-vertex histogram indicates how many views predict a specific class. Once all images have been processed, the per-vertex class is assigned to be the class that relates to the histogram bin with the highest value. The per-triangle label is determined using following rule: the triangle is labeled as class 'x' if all of its adjacent vertices are labeled as class 'x'.

Predicted semantic information indicates which parts (triangles) of the 3D mesh are the part of walls, ceilings or floors. However, in a standard four walled room, this means that different walls cannot be distinguished. As such, verification component 112 (FIG. 1) is configured to separate triangles labeled as in the "wall" class into separate wall instances. Specifically, each triangle labeled as wall will also store an instance index that specifies which specific wall it belongs to.

To determine the wall instance indices, verification component 112 first determines a dual of the input triangle mesh, which facilitates determinations about triangles and their neighbors. After the transformation into the dual mesh, a Union-Find data structure is utilized to separate the triangles labeled as walls into separate walls.

Figure 11:
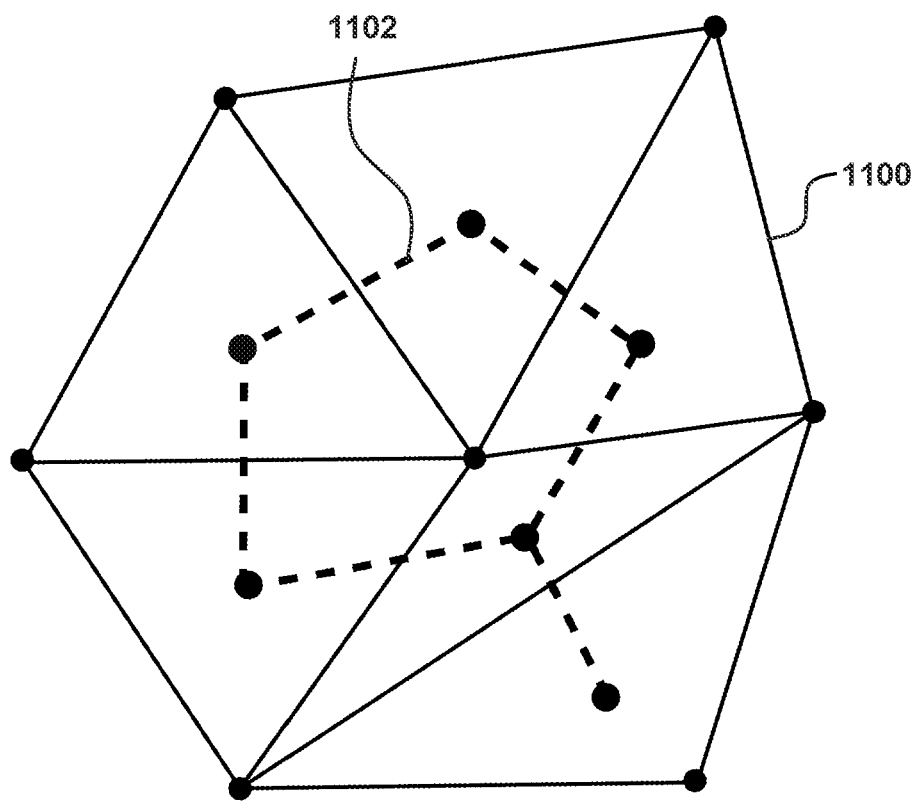
FIG. 11 illustrates determination of a dual of an input triangle mesh, in accordance with one or more embodiments.

A dual of the input triangle mesh is determined. This transformation converts each of the triangles into a vertex and joins them if the original triangles were neighbors. For each of the new vertices, a position is stored, determined as an average of an original triangle's vertex positions, and a triangle's normal vector. A simple visualization of this transformation is illustrated in FIG. 11. FIG. 11 illustrates an initial (primal) triangle mesh 1100 and a dual mesh 1102.

A Union-Find data structure facilitates fast connected components computation based on a predefined predicate, through the combination of union and find operations. A Union-Find data structure works by iterating over pairs of elements (vertices of the dual mesh connected by an edge) and deciding whether union operation should be executed. Union will occur only if the two elements satisfy the predicate. As such, verification component 112 (FIG. 1) is configured to specify an order in which edges are tested, as well as a predicate.

To specify the order, verification component 112 associates a weight with every edge of the new dual mesh, based on the angle between normal vectors stored at each vertex of the dual mesh. Verification component 112 is configured to sort the edges based on these angles in an ascending order, which defines iteration order.

The predicate tests two conditions. First, it computes an angle between normal vectors stored at each vertex and checks if the angle is less than a predefined angle threshold. Second, it computes symmetric point-to-plane distance and checks if the distances are less than predefined distance threshold. Note that each vertex stores both position and normal vector which is a geometric representation of a plane, allowing determination of the point-to-plane distances. This means that vertices belonging to the same plane in 3D space will be connected by the Union-Find data structure.

Given a one-to-one correspondence between triangles of a primal mesh and the vertices of the dual mesh, verification component 112 (FIG. 1) can copy the instance indices back into the primal mesh, allowing a split of the triangles labeled as walls into separate, co-planar walls.

As described above, floor and wall planar regions may be detected, alongside their footprints. Verification component 112 may use this information to intersect each of the wall planar regions with the floor region, yielding a set of 2D lines within the floor plane. Verification component 112 may also use the determined footprints to convert the 2D lines (which stretch to infinity in both directions) to segments. These segments may be termed wall segments as they outline an initial estimate of where the walls are within the floor plane. Normal vectors to the wall planes may be stored with the associated wall segment. Given that there are two possible normal vectors for any plane, the normal vector that points toward a camera view is chosen.

The wall segments detected as described above may not be directly used as the floor plans as they generally do not connect into a polygon outlining the floor plan. Converting wall segments into a floor polygon comprises tessellation of a floor plane, classification of cells as floor or not floor, and/or other operations.

Tessellation of the floor plane comprises finding a bounding rectangle of the wall segments and extend the bounding rectangle by a target amount (e.g., 1 m) in all directions to create an initial cell comprising four vertices at bounding rectangle corners. Verification component 112 (FIG. 1) is configured to split this cell by cutting it using lines defined by each of the wall segments. Verification component 112 is also configured to store how much each of the resulting edges of the tessellation overlaps with each of the wall segments. To perform this tessellation quickly, verification component 112 is configured to implement a variant of a half edge data structure which allows for constant time updates of the topology after a cutting operation. The output of this stage is a set of cells (n-sided polygons) with edges that store weights proportional to their overlap with the input wall segments, denoted as $O_{ij}$.

Figure 12:
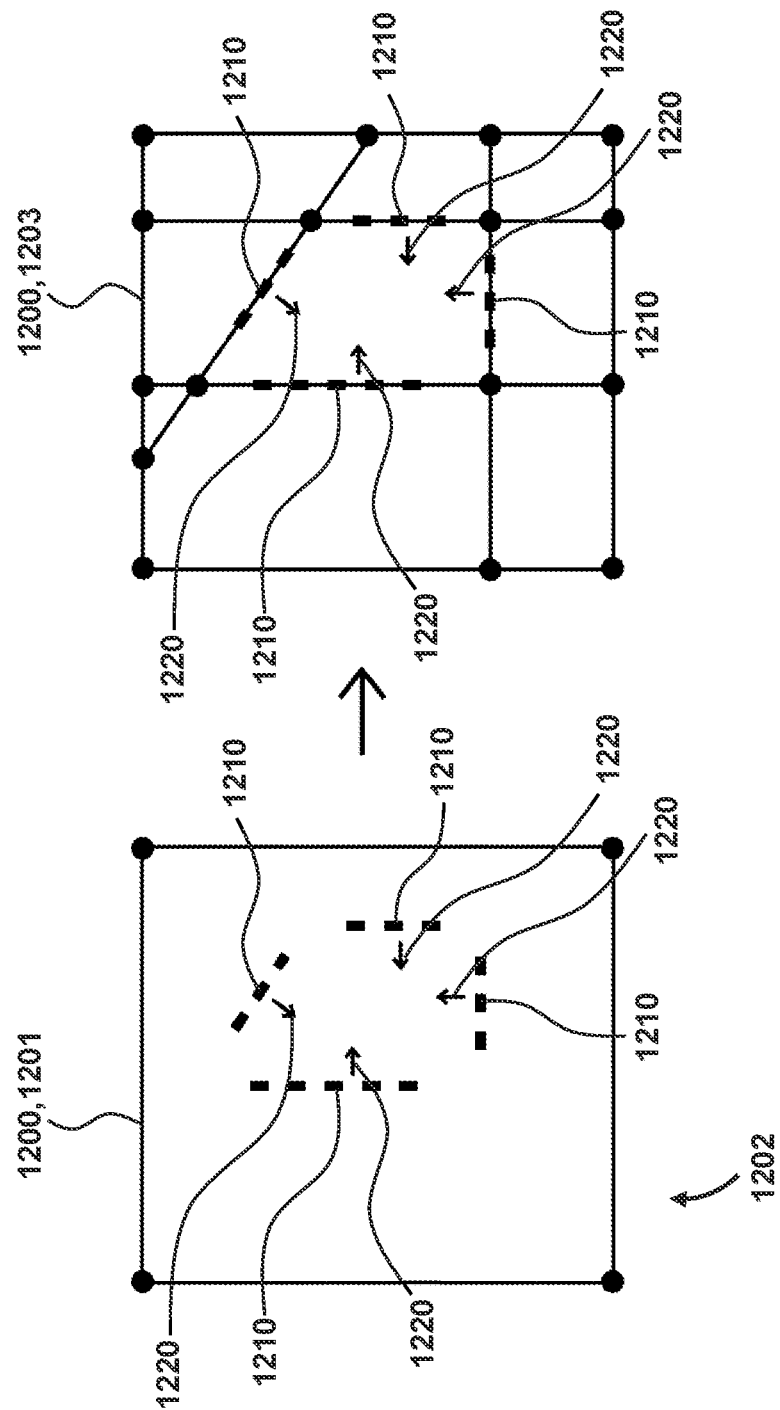
FIG. 12 illustrates tessellation of a floor plane comprising finding a bounding rectangle of wall segments and extend the bounding rectangle by a target amount (e.g., 1 m) in all directions to create an initial cell comprising four vertices at bounding rectangle corners; splitting this cell by cutting it using lines defined by each of the wall segments; and storing how much each of the resulting edges of the tessellation overlaps with each of the wall segments, in accordance with one or more embodiments.

This process is further illustrated in FIG. 12. For example, FIG. 12 illustrates tessellation 1200 of a floor plane 1202 comprising finding a bounding rectangle of wall segments and extend the bounding rectangle by a target amount (e.g., 1 m) in all directions to create an initial cell 1201 comprising four vertices at bounding rectangle corners; splitting this cell 1203 by cutting it using lines defined by each of the wall segments; and storing how much each of the resulting edges of the tessellation overlaps with each of the wall segments. FIG. 12 illustrates tessellation 1200, wall segments 1210, and normal vectors 1220.

Classifying cells as floor or not floor comprises a modified version of the method described in "Consistent Solid and Boundary Representations from Arbitrary Polygonal Data," Murali and Funkhouser, SIGGRAPH '97. Verification component 112 (FIG. 1) is configured to use the output of the previous stage to set up the classification procedure. Note that the tessellation has m+n cells, where there are m boundary cells (cells adjacent to the region outside the tessellation) and n interior cells. The i-th cell is denoted as $C_i$ and link between cell i and j as $L_{ij}$. Each link $L_{ij}$ has the following quantities associated with it: $L_{ij}$ is the total length of the edge shared by cell i and j; $O_{ij}$ is the overlap factor between link $L_{ij}$ and the wall segment (1210 in FIG. 12); and $n_{ij}$ is the normal vector associated with generating wall segment. The tessellation can be converted to a system of linear equations Ax=b where: x is the vector of unknowns of size n; b is the vector of values computed from the tessellation grid: bi=0, if $C_i$ is a boundary cell, otherwise:

$$b_i = \text{sign}\,(\hat{s}_i) \Sigma_j o_{ij}$$

where $\hat{s}_i$ is the average of the orientation of the normal $n_{ij}$ with respect to the center of the cell $C_i$. Orientation is expressed as 1 if $n_{ij}$ points towards the cell, and as −1 if it points outside the cell. A is n×n matrix, which can be populated using the tessellation grid: $A_{ii}=c$, if $C_i$ is a boundary cell, where c is large constant value (e.g., 1000). The resulting system of linear equations is sparse and can then be solved using off the shelf sparse linear system solver. When the system is solved, the sign of each entry xi indicates whether the cell Ci gets assigned floor (xi>=0.5) or not-floor (xi<0.5).

The previous steps yield a set of cells labeled as a floor. Verification component 112 is configured to traverse each of the floor cells and extract outline edges. An outline edge is an edge of a floor cell that has a non-floor cell on the other side. The set of outline edges is connected head to tail in a counterclockwise order to generate the set of vertices defining the floor polygon. In case there are multiple disjointed floor cells, the above described extraction is performed for each of the disjointed cells, returning multiple floor-plan polygons.

In some embodiments, verification component 112 (FIG. 1) is configured for automated wall generation. Again, to lower the amount of time a back-office adjuster (as one example user) spends on measuring the 3D representation of the physical scene at a location (e.g., as described above), and/or for other reasons, verification component 112 may be configured (in addition to and/or instead of a configuration described above) to provide an automated solution for estimating one or more walls and their surface areas automatically. Automatically generated walls can serve as a starting point for a user such as a back-office adjuster, requiring little to no manual adjustments (e.g., as described above).

Verification component 112 (FIG. 1) may be configured to leverage an automatically generated interactive 3D representation (as described above), a manually and/or automatically generated floor plan (as described above), and/or other information for automated wall generation. Automated wall generation may include detecting physical scene (e.g., room) structures from an input video, transferring detections onto the interactive 3D representation, extrusion of wall rectangles from a generated floor plan, co-planar region determination for separation of windows and doors (or other cut outs), bounding rectangle determination, filtering of detected windows and doors (or other cut outs), projection of bounding rectangles, and/or other operations.

Given an input video of a physical scene at a location (e.g., a room in a house) captured by a user as described above, verification component 112 is configured to perform semantic segmentation of each video frame using a deep neural network that is part of the one or more machine learning models described above. Given a frame from a video the neural network predicts a per-pixel class index, each of which relates to a different semantic class. The semantic classes include classes for "other", "floor", "wall", and "ceiling", "window", "door", etc. As such, for each image, verification component 112 is configured to determine which parts of the image belong to a floor, wall, ceiling, window, door, or none of those.

The deep neural network may be based on the Swin Transformer ("Swin Transformer: Hierarchical Vision Transformer using Shifted Windows", Liu et al. 2021)" architecture, and adapted to output per-pixel class indices (such as those described above). The classification heads of the network utilize feature pyramids from the Swin Transformer backbone. The features at each pyramid level are resized to a common resolution via bilinear interpolation and then concatenated hierarchically along the feature dimension, followed by a convolutional layer to reduce the size along the feature dimension. Fused features are then passed to a classification head comprising convolutional layers that output the final per-class label. The deep neural network is trained using a semantic segmentation dataset with ground truth labels for over 10 k images.

Using the deep neural network, verification component (FIG. 1) predicts the semantic classes for input video frames, which are 2D entities. The interactive 3D representation of the physical scene may be stored as a triangle mesh (as described above), which is a graph data structure storing lists of vertices and a list of indices that indicate which vertices are joined together as a triangle. Each vertex can be equipped with a number of attributes like position, surface normal vector, semantic class index, etc.

To predict, verification component 112 utilizes camera poses and intrinsics (captured alongside the video using the VIO system, like Apple's ARKit or Google's ARCore). The interactive 3D representation and camera data are used to project the mesh vertices onto a camera image plane. This process facilitates mapping each of the mesh's vertices to the image coordinates, and looking up a predicted label. Verification component 112 is configured to store a per-vertex histogram which indicates how many views predict a specific class. For each of the labeled frames predicted in step one, verification component 112 determines the projected coordinates. If a vertex falls into a region labeled as class 'x', the per-vertex histogram bin for the class 'x' will be increased by one. Once all images have been processed, verification component 112 is configured to assign the per-vertex class to be the class that relates to the histogram bin with the highest value. Verification component 112 determines the per-triangle label using the following rule: the triangle is labeled as class 'x' if all of its adjacent vertices are labeled as class 'x'.

As described above, a floorplan may be determined (manually or automatically) based on the interactive 3D representation. The interactive 3D representation may be used by verification component 112 as input for the following operations, along with a segmented mesh determined as described above. Verification component 112 is configured to determine the centroid $c_f$ of all triangles labeled as "floor" and a centroid $c_c$ of all triangles labeled as "ceiling." Verification component 112 determines the Euclidean distance between these points, denoted as $h=\|c_f-c_c\|_2$.

Verification component 112 is configured to traverse over all boundary edges $b_i$ of a floorplan polygon. Each edge $b_i$ connects two vertices $v_{i0}$ and $v_{i1}$. A floorplan polygon is a two-dimensional entity embedded in 3-dimensional space. As such, verification component 112 may determine a normal vector to the floor polygon, which will point in the negative gravity direction (up direction), which is denoted u. For each boundary edge, verification component 112 can determine a wall-rectangle with the following vertices:

$\{v_{i0}, v_{i1}, v_{i1}+h*u, v_{i0}+h*u\}$

Predicted semantic information indicates which parts (triangles) of the 3D mesh are part of major structural elements in the physical scene. Verification component 112 (FIG. 1) is configured to separate each semantic class into distinct instances. With only the semantic information, the number of windows, and an indication of which faces belong to each window is unknown. As such, verification component 112 is configured to separate all triangles labeled as "window" or "door" classes into separate instances. Specifically, each triangle labeled as window/door will also store an instance index.

To determine the instance indices, verification component 112 is configured to determine the dual of the input triangle mesh, which allows verification component 112 to make determinations about triangles and their neighbors. After the transformation into the dual mesh, a Union-Find data structure may be utilized to separate the triangles labeled as walls into separate walls, for example.

As described above, verification component 112 is configured to determine a dual of the input triangle mesh. This transformation converts each of the triangles into a vertex and joins them, if the original triangles were neighbors. For each of the new vertices, a position is stored, calculated as an average of the original triangle's vertex positions, and the original triangle's normal (also see FIG. 11 and its corresponding description above).

As described above, the Union-Find data structure facilitates fast connected components computation based on a predefined predicate, through the combination of union and find operations. The Union-Find data structure works by iterating over pairs of elements (vertices of the dual mesh connected by an edge) and deciding whether the union operation should be executed. The union operation will occur only if the two elements satisfy the predicate. Thus, verification component 112 is configured to specify the order in which edges are tested (for automated floor plan generation as described above, as well as automated wall generation described here), as well as the predicate.

To specify the order, verification component 112 is configured to associate a weight with every edge of the new dual mesh, based on the angle between normal vectors stored at each vertex. Verification component 112 is configured to sort the edges based on these angles in an ascending order, which defines iteration order.

The predicate tests three conditions. First, it determines an angle between normal vectors stored at each vertex of the dual mesh and determines whether the angle is less than a predefined angle threshold. Second, it determines symmetric point-to-plane distance and determines whether the distances are less than the predefined distance threshold. Third, it determines whether the two vertices have the same semantic class. This means that vertices belonging to the same semantic class and lying on the same plane in 3D space will be connected by the Union-Find data structure Given one-to-one correspondence between triangles of the primal mesh and the vertices of the dual mesh, verification component 112 may copy the instance indices back into the primal mesh, facilitating splitting the triangles labeled as walls into separate, co-planar walls.

As described above, a set of segments is determined, each comprising of a list of triangles that belong to a single window/door. Such a representation may be of little use to a back-office insurance adjustor (as one example) as a raw list of triangles is hard to edit and manipulate. As such, verification component 112 (FIG. 1) is configured to determine a bounding rectangle for each window/door segment and use that as a representation provided to the user.

To determine a bounding rectangle, verification component 112 uses the fact that the triangles in a segment are approximately coplanar—and determines an average normal n from all triangles that belong to the segment. Combined with the direction u defined above, verification component 112 can compute a 3D basis as: $\{v=u \times \tilde{n}, u, \tilde{n}\}$. This set of basis vectors allows verification component 112 to find a bounding rectangle in 2D subspace defined by vectors v and u. To do so, verification component 112 determines a centroid c of each segment. Verification component 112 then determines the maximum distance along v and u from c to each of the vertices belonging to the current segment, denoted as $e_v$ and $e_u$. The bounding rectangle is specified as a list of rectangle vertices $\{c+e_v \; v+e_u u, \; c-e_v \; v+e_u u, \; c-e_v \; v-e_u u, \; c+e_v \; v-e_u u\}$. Verification component 112 also stores the average normal n and centroid c alongside the bounding rectangle. As a result, each segment comprises a list of triangles, the list of rectangle vertices, an average normal vector, and the centroid.

In some embodiments, the co-planar region determination may produce over-segmentation due to errors in deep neural network predictions or errors in the interactive 3D representation, for example. As such, to generate candidates for walls including windows, doors, vents, and/or other cut outs, verification component 112 (FIG. 1) is configured to filter some spurious segments using the following filtering procedure. Verification component 112 is configured to test for two conditions and only accept a segment as valid if it satisfies both conditions. First, an area condition is tested. For each candidate window and door segment, verification component 112 is configured to determine its area as a sum of areas of triangles that belong to a segment. A candidate segment satisfies this condition if its area is greater than a predefined threshold. Second, a distance-to-wall condition is tested. For each candidate window and door segment, verification component 112 is configured to determine the point-to-plane distance between the segment's centroid c and all the wall rectangles sharing the same orientation as the considered segment. Verification component 112 determines the distance d to the closest, similarly oriented wall. A candidate satisfies the distance-to-wall condition if d is smaller than a predefined threshold.

Verification component 112 is configured to associate each of the window/door rectangles described above with wall rectangles. For each window/door rectangle, verification component 112 seeks the closest wall rectangle. The distance between rectangles is specified as a function of normal vector angle (the smaller the angle, the closer two rectangles are) as well as point-to-plane distance. Once verification component 112 associates each window/door with a wall, all of the window/door vertices are projected onto the wall plane.

A set of wall rectangles is then stored with associated window and door rectangles. Verification component 112 is configured to determine the wall area accurately, by determining the area of a wall-rectangle and then subtracting the areas of the associated windows and doors and/or other cut outs (so that verification component 112 will not overestimate the wall area by including the doors and windows).

Several terms used in the present disclosure are discussed below to improve the understanding of concepts of the present disclosure. "CAD model" refers to a 3D model of a structure, object, or geometric primitive that has been manually constructed or improved using computer-aided design (CAD) tools. "Extrinsics" or "extrinsics matrix" refers to a matrix representation of the rigid-body transformation between a fixed 3-dimensional Cartesian coordinate system defining the space of a virtual world and a 3-dimensional Cartesian coordinate system defining that world from the viewpoint of a specific camera. "Inertial measurement unit" (IMU) refers to a hardware unit comprising accelerometers, gyroscopes, and magnetometers that can be used to measure the motion of a device in physically-meaningful units. "Intrinsics" or "Intrinsics matrix" refers to a matrix representation of physical attributes of a real camera comprising focal length, principal point, and skew. "Point cloud" refers to a collection of 3-dimensional points, wherein each point has information comprising 3D position, color information, and surface normal information, among other pertinent data. "Mesh" refers to an explicit representation of a 3D surface consisting of vertices connected by edges. The vertices comprise the same information as a 3D point cloud, with the possible addition of texture coordinates, while the edges define planar surfaces called faces, typically triangular or quadrilateral, which themselves may comprise color information, surface normals, among other pertinent data. "Multi-layer perceptron" (MLP) refers to a type of feed-forward neural network which models a network as a series of one or more nonlinear weighted aggregations of data. Typically, these networks comprise sequential layers of aggregations with varying dimensionality. This class of algorithms are generally considered to be able to approximate any mathematical function. "Convolutional neural network" (CNN) refers to a particular neural network having an input layer, hidden layers, and an output layer and configured to perform a convolution operation. The hidden layers (also referred as convolutional layers) convolve the input and pass its result to the next layer. "Pose matrix" refers to a matrix representation of a camera's relative or absolute orientation in the virtual world, comprising the 3-degrees-of-freedom rotation of the camera, and the 3-degrees-of-freedom position of the camera in the world. This is the inverse of the extrinsics matrix. The pose may refer to a combination of position and orientation or orientation only. "Posed image" refers to an RGB or RGB-D image with associated information describing the capturing camera's relative orientation in the world, comprising the intrinsics matrix and one of the pose matrix or extrinsics matrix. "RGB image" refers to a 3-channel image representing a view of a captured scene using a color space, wherein the color is broken up into red, green, and blue channels. "RGB-D image" refers to a 4-channel image consisting of an RGB image augmented with a depth map as the fourth channel. The depth can represent the straight-line distance from the image plane to a point in the world, or the distance along a ray from the camera's center of projection to a point in the world. The depth information can contain unitless relative depths up to a scale factor or metric depths representing absolute scale. The term RGB-D image can also refer to the case where a 3-channel RGB image has an associated 1-channel depth map, but they are not contained in the same image file. "Signed distance function" (SDF) refers to a function that provides an implicit representation of a 3D surface, and may be stored on a voxel grid, wherein each voxel stores the distance to the closest point on a surface. The original surface can be recovered using an algorithm of the class of isosurface extraction algorithms comprising marching cubes, among others. "Structure from Motion" (SFM) refers to a class of algorithms that estimate intrinsics and extrinsic camera parameters, as well as a scene structured in the form of a sparse point cloud. SFM can be applied to both ordered image data, such as frames from a video, as well unordered data, such as random images of a scene from one or more different camera sources. Traditionally, SFM algorithms are computationally expensive and are used in an offline setting. "Simultaneous localization and mapping" (SLAM) refers to a class of algorithms that estimate both camera pose and scene structure in the form of point cloud. SLAM is applicable to ordered data, for example, a video stream. SLAM algorithms may operate at interactive rates, and can be used in online settings. "Textured mesh" refers to a mesh representation wherein the color is applied to the mesh surface by UV mapping the mesh's surface to RGB images called texture maps that contain the color information for the mesh surface. "Truncated SDF" (TSDF) refers to a particular variation of the SDF representation that only stores the SDF where its contained distances are smaller than a predefined threshold. "Isosurface" refers to, in the context of SDF and TSDF, a 2-dimensional surface that is described by all points whose distance to the surface is 0, also called the "0-level set." "UV mapping" refers to a mapping between the coordinates of a 3D point on a mesh and a 2-dimensional coordinate on a planar surface. UV mapping may be used to display high-resolution color (texture) on 3D mesh surfaces. "VI-SLAM" refers to a visual-inertial simultaneous localization and mapping. VI-SLAM may be a particular type of SLAM algorithm that performs SLAM using both image and IMU data. "Voxel" refers to a portmanteau of "volume element." Voxels are cuboidal cells of 3D grids and are effectively the 3D extension of pixels. Voxels can store various types of information, including occupancy, distance to surfaces, colors, and labels, among others. "Wireframe" refers to a visualization of a mesh's vertices and edges, revealing the topology of the underlying representation. "Z-buffer" refers to, in rendering, an image which stores the distance to the closest surface observed by a specific camera. In modern rendering pipelines, Z-buffers are constructed by default. As such they do not add any additional computational cost to the rendering process.

The term "metadata" refers to a set of data that describes and gives information about other data. Examples of the metadata are provided throughout the disclosure further for better understanding of the concept. The term "interactive 3D representation" refers to a geometric model of a physical scene at a location in a digital form and may include texture or color information. The interactive 3D representation may be represented in the form of a 3D mesh, a 3D solid, a 3D boundary, a 3D point cloud, or other digital formats. The term "virtual representation" refers to an information-rich data representation of a location that takes the form of a 3D model, textured or otherwise, along with semantically labeled elements, spatially localized metadata, and/or application-specific data. In some embodiments, the virtual representation may comprise a building information model representation of a location to facilitate design, construction, insurance, and operation processes to form a reliable basis for decisions related to services and/or tasks to be performed at the location.

In the following, further features, characteristics, and exemplary technical solutions of the present disclosure will be described in terms of items that may be optionally claimed in any combination:

1. A non-transitory computer readable medium having instructions thereon, the instructions configured to cause a computer to execute, in a browser, an interactive three dimensional electronic representation of a physical scene at a location to determine attributes of the physical scene, the browser having a limited computing capability compared to a native application or hardware usable by the computer, the interactive three dimensional representation configured to minimize overall computing resources and processing time for determining the attributes, the instructions causing operations comprising: receiving video images of the physical scene, the video images generated via a camera associated with a user; generating, with a trained machine learning model, the interactive three dimensional representation of the physical scene, wherein the interactive three dimensional representation comprises a textured or untextured three-dimensional mesh with vertices connected by edges, defining triangular or quadrilateral planar faces, wherein the vertices and the faces each separately comprise position, color, and/or surface normal information; extracting data items from the interactive three dimensional representation with the trained machine learning model, wherein the data items correspond to surfaces and/or contents in the physical scene; determining attributes of the data items with the trained machine learning model, the attributes comprising dimensions and/or locations of the surfaces and/or contents; identifying a subset of the data items with the trained machine learning model, the subset of the data items comprising a ceiling, a floor, and walls of the physical scene; and causing interactive human verification of the attributes of the subset of data items by: receiving user selection of the ceiling, the floor, or a wall, and flattening a view of the selected ceiling, floor, or wall from the interactive three dimensional representation to two dimensions; receiving user adjustments to the dimensions and/or locations of the selected ceiling, floor, or wall; receiving user indications of cut outs in the selected ceiling, floor, or wall, a cut out comprising a window, a door, or a vent in the selected ceiling, floor, or wall; and updating, with the trained machine learning model, the interactive three dimensional representation based on adjustments to the dimensions and/or locations, and/or the indications of cut outs for continued display an manipulation in the browser.

2. The medium of any previous item, wherein generating the interactive three dimensional representation of the physical scene comprises rendering the mesh for manipulation by the user in the browser with limited computing resources, such that artifacts that are no longer being actively used are disposed of, those artifacts that can be reused are stored, and new artifacts are added only as needed, wherein the artifacts comprise metadata associated with mesh faces 3. The medium of any previous item, wherein the trained machine learning model is trained by: obtaining physical scene data associated with a specified physical scene at the location, wherein the physical scene data includes an image, a video or a prior three dimensional digital model associated with the specified physical scene; and training the machine learning model with the physical scene data to predict a specified set of surfaces and/or contents in the specified physical scene such that a cost function that is indicative of a difference between a reference set of surfaces and/or contents and the specified set of contents is minimized.

4. The medium of any previous item, wherein the video images include interior and/or exterior condition information about the location, wherein the interior and/or exterior condition information comprises a description of a geographical position of the location; and wherein the description of the geographical position of the location is compared to corresponding information for the location from an external location information database.

5. The medium of any previous item, wherein the trained machine learning model is trained with training data, the training data comprising input output training pairs associated with each potential data item.

6. A non-transitory computer readable medium having instructions thereon, the instructions configured to cause a computer to execute an interactive three dimensional electronic representation of a physical scene at a location to determine attributes of the physical scene, the instructions causing operations comprising: receiving description data of the physical scene at the location, generating, with a trained machine learning model, the interactive three dimensional representation of the physical scene based on the description data, the interactive three dimensional representation comprising data items corresponding to surfaces and/or contents in the physical scene; and causing, in a browser running on the computer, interactive human verification of attributes of a subset of data items by: receiving user selection of a data item comprising a ceiling, a floor, or a wall of the physical scene, and flattening a view of the selected ceiling, floor, or wall from the interactive three dimensional representation to two dimensions; receiving user adjustments to attributes including dimensions and/or a location of the selected ceiling, floor, or wall; receiving user indications of cut outs in the selected ceiling, floor, or wall; and updating, with the trained machine learning model, the interactive three dimensional representation based on user adjustments to the dimensions and/or locations, and/or the indications of cut outs, for continued display and manipulation in the browser.

7. The medium of any previous item, wherein generating the interactive three dimensional representation of the physical scene comprises rendering a mesh for manipulation by the user in the browser with limited computing resources, such that artifacts that are no longer being actively used are disposed of, those artifacts that can be reused are stored, and new artifacts are added only as needed, wherein the artifacts comprise metadata associated with mesh faces.

8. The medium of any previous item, wherein the trained machine learning model is trained with training data, the training data comprising input output training pairs associated with each potential data item.

9. The medium of any previous item, wherein description data comprises one or more images of the physical scene, and the one or more images are generated via a camera associated with a user.

10. The medium of any previous item, wherein the interactive three dimensional representation comprises a textured or untextured three-dimensional mesh with vertices connected by edges, defining triangular or quadrilateral planar faces, wherein the vertices and the faces each separately comprise position, color, and/or surface normal information.

11. The medium of any previous item, the operations further comprising extracting data items from the interactive three dimensional representation with the trained machine learning model.

12. The medium of any previous item, wherein extracting the data items includes providing the interactive three dimensional representation as an input to the trained machine learning model to identify the data items, wherein the trained machine learning model comprises a convolutional neural network (CNN) and is trained to identify objects and structures in multiple physical scenes as the data items.

13. The medium of any previous item, wherein the trained machine learning model is trained by: obtaining physical scene data associated with a specified physical scene at the location, wherein the physical scene data includes an image, a video or a three dimensional digital model associated with the specified physical scene; and training the machine learning model with the physical scene data to predict a specified set of surfaces and/or contents in the specified physical scene such that a cost function that is indicative of a difference between a reference set of surfaces and/or contents and the specified set of contents is minimized.

14. The medium of any previous item, the operations further comprising determining the attributes of the data items with the trained machine learning model, the attributes comprising dimensions and/or locations of the surfaces and/or contents.

15. The medium of any previous item, the operations further comprising identifying the subset of the data items with the trained machine learning model, the subset of the data items comprising the ceiling, the floor, and the walls of the physical scene.

16. The medium of any previous item, wherein the trained machine learning model is configured to predict spatial localization data of the data items, the spatial localization data corresponding to location information of the surfaces and/or contents in the physical scene.

17. The medium of any previous item, wherein the description data is generated via at least one of a camera, a user interface, an environment sensor, and an external location information database, the description data comprising one or more images of the physical scene.

18. The medium of any previous item, wherein a cut out comprises a window, a door, or a vent in a selected ceiling, floor, or wall.

19. The medium of any previous item, wherein the description data comprises one or more media types, the one or more media types comprising at least one or more of video data, image data, audio data, text data, user interface/display data, and/or sensor data, and wherein receiving description data comprises receiving sensor data from one or more environment sensors, the one or more environment sensors comprising at least one of a GPS, an accelerometer, a gyroscope, a barometer, or a microphone.

20. The medium of any previous item, the operations further comprising determining one or more insurance underwriting estimates with the trained machine learning model based on an updated interactive three dimensional representation.

21. The medium of any previous item, the operations further comprising determining point to point measurements in the interactive three dimensional representation, determining area measurements of one or more data items, and/or receiving user annotations related to one or more of the data items.

22. The medium of any previous item, wherein the description data is time stamped, geo stamped, and/or user stamped.

23. The medium of any previous item, wherein the description data includes interior and/or exterior condition information about the location, wherein the interior and/or exterior condition information comprises a description of a geographical position of the location; and wherein the description of the geographical position of the location is compared to corresponding information for the location from an external location information database.

24. The medium of any previous item, wherein flattening the view of the selected ceiling, floor, or wall from the interactive three dimensional representation to two dimensions comprises flattening a height or depth dimension in the view of the selected ceiling, floor, or wall, and forcing additional input form a user into a plane formed by the selected ceiling, floor, or wall.

25. The medium of any previous item, the operations further comprising moving a view of the physical scene in the interactive three dimensional electronic representation to match a position and field of view of a user's device that was used to obtain the description data by applying a background blur while moving the view.

26. A method for executing an interactive three dimensional electronic representation of a physical scene at a location to determine attributes of the physical scene, the method comprising: receiving description data of the physical scene at the location, generating, with a trained machine learning model, the interactive three dimensional representation of the physical scene based on the description data, the interactive three dimensional representation comprising data items corresponding to surfaces and/or contents in the physical scene; and causing, in a browser running on the computer, interactive human verification of attributes of a subset of data items by: receiving user selection of a data item comprising a ceiling, a floor, or a wall of the physical scene, and flattening a view of the selected ceiling, floor, or wall from the interactive three dimensional representation to two dimensions; receiving user adjustments to attributes including dimensions and/or a location of the selected ceiling, floor, or wall; receiving user indications of cut outs in the selected ceiling, floor, or wall; and updating, with the trained machine learning model, the interactive three dimensional representation based on user adjustments to the dimensions and/or locations, and/or the indications of cut outs, for continued display and manipulation in the browser.

27. The method of any previous item, wherein generating the interactive three dimensional representation of the physical scene comprises rendering a mesh for manipulation by the user in the browser with limited computing resources, such that artifacts that are no longer being actively used are disposed of, those artifacts that can be reused are stored, and new artifacts are added only as needed, wherein the artifacts comprise metadata associated with mesh faces.

28. The method of any previous item, wherein the trained machine learning model is trained with training data, the training data comprising input output training pairs associated with each potential data item.

29. The method of any previous item, wherein description data comprises one or more images of the physical scene, and the one or more images are generated via a camera associated with a user.

30. The method of any previous item, wherein the interactive three dimensional representation comprises a textured or untextured three-dimensional mesh with vertices connected by edges, defining triangular or quadrilateral planar faces, wherein the vertices and the faces each separately comprise position, color, and/or surface normal information.

31. The method of any previous item, the operations further comprising extracting data items from the interactive three dimensional representation with the trained machine learning model.

32. The method of any previous item, wherein extracting the data items includes providing the interactive three dimensional representation as an input to the trained machine learning model to identify the data items, wherein the trained machine learning model comprises a convolutional neural network (CNN) and is trained to identify objects and structures in multiple physical scenes as the data items.

33. The method of any previous item, wherein the trained machine learning model is trained by: obtaining physical scene data associated with a specified physical scene at the location, wherein the physical scene data includes an image, a video or a three dimensional digital model associated with the specified physical scene; and training the machine learning model with the physical scene data to predict a specified set of surfaces and/or contents in the specified physical scene such that a cost function that is indicative of a difference between a reference set of surfaces and/or contents and the specified set of contents is minimized.

34. The method of any previous item, the operations further comprising determining the attributes of the data items with the trained machine learning model, the attributes comprising dimensions and/or locations of the surfaces and/or contents.

35. The method of any previous item, the operations further comprising identifying the subset of the data items with the trained machine learning model, the subset of the data items comprising the ceiling, the floor, and the walls of the physical scene.

36. The method of any previous item, wherein the trained machine learning model is configured to predict spatial localization data of the data items, the spatial localization data corresponding to location information of the surfaces and/or contents in the physical scene.

37. The method of any previous item, wherein the description data is generated via at least one of a camera, a user interface, an environment sensor, and an external location information database, the description data comprising one or more images of the physical scene.

38. The method of any previous item, wherein a cut out comprises a window, a door, or a vent in a selected ceiling, floor, or wall.

39. The method of any previous item, wherein the description data comprises one or more media types, the one or more media types comprising at least one or more of video data, image data, audio data, text data, user interface/display data, and/or sensor data, and wherein receiving description data comprises receiving sensor data from one or more environment sensors, the one or more environment sensors comprising at least one of a GPS, an accelerometer, a gyroscope, a barometer, or a microphone.

40. The method of any previous item, the operations further comprising determining one or more insurance underwriting estimates with the trained machine learning model based on an updated interactive three dimensional representation.

41. The method of any previous item, the operations further comprising determining point to point measurements in the interactive three dimensional representation, determining area measurements of one or more data items, and/or receiving user annotations related to one or more of the data items.

42. The method of any previous item, wherein the description data is time stamped, geo stamped, and/or user stamped.

43. The method of any previous item, wherein the description data includes interior and/or exterior condition information about the location, wherein the interior and/or exterior condition information comprises a description of a geographical position of the location; and wherein the description of the geographical position of the location is compared to corresponding information for the location from an external location information database.

44. The method of any previous item, wherein flattening the view of the selected ceiling, floor, or wall from the interactive three dimensional representation to two dimensions comprises flattening a height or depth dimension in the view of the selected ceiling, floor, or wall, and forcing additional input form a user into a plane formed by the selected ceiling, floor, or wall.

45. The method of any previous item, the operations further comprising moving a view of the physical scene in the interactive three dimensional electronic representation to match a position and field of view of a user's device that was used to obtain the description data by applying a background blur while moving the view.

46. A non-transitory computer readable medium having instructions thereon, the instructions configured to cause a computer to execute an interactive three dimensional electronic representation of a physical scene at a location to determine a floor plan of the physical scene, the instructions causing operations comprising: receiving description data of the physical scene at the location, generating, with a trained machine learning model, the interactive three dimensional representation of the physical scene based on the description data, the interactive three dimensional representation comprising data items corresponding to surfaces and/or contents in the physical scene; and determining, based on the interactive three dimensional representation and the data items, the floor plan, by: transferring detections of physical scene structures indicated by the data items to the interactive three dimensional representation; determining co-planar regions of the three dimensional representation for wall separation; determining wall segments within a floor plane of the three dimensional representation; tessellating the floor plane using the determined wall segments; classifying cells of the tessellation as floor or not floor; and extracting a floor plan polygon from cells classified as floor.

47. The medium of any previous item, wherein the interactive three dimensional representation of the physical scene is stored as a triangle mesh, which comprises a graph data structure storing lists of vertices and a list of indices that indicate which vertices are joined together as a triangle, with each vertex comprising attributes including a position, a color, a normal vector, a parametrization coordinate, an instance index and a semantic class index; and wherein transferring detections of physical scene structures indicated by the data items to the interactive three dimensional representation comprises: predicting, with a trained machine learning model, semantic classes for two dimensional input video frames included in the description data, projecting mesh vertices onto a camera image plane to map each of the mesh's vertices to image coordinates and determine a predicted label; determining whether a projected mesh vertex falls into a region labeled as a floor; and determining a per mesh triangle label, where a triangle is labeled as part of the floor if all of its adjacent vertices are labeled as floor.

48. The medium of any previous item, wherein the interactive three dimensional representation of the physical scene is stored as a triangle mesh, and wherein determining co-planar regions of the three dimensional representation for wall separation comprises: determining a dual of the triangle mesh; and utilizing a Union-Find data structure to separate triangles labeled as walls into separate walls.

49. The medium of any previous item, wherein determining wall segments within the floor plane of the three dimensional representation comprises: intersecting each of two or more wall planar regions with a floor region, to yield a set of two dimensional lines within a floor plane; converting the two dimensional lines to segments; and storing a normal vector associated with each wall plane.

50. The medium of any previous item, wherein tessellating the floor plane using the determined wall segments comprises: determining a bounding rectangle that bounds wall segments and extend the bounding rectangle by a predetermined amount in all directions to create an initial cell comprising four vertices at the bounding rectangle corners; splitting the initial cell by cutting it using lines defined by each of the wall segments, and store an amount that resulting edges of a tessellation overlap with each of the wall segments; and outputting a set of n-sided polygon cells with edges that store weights proportional to their overlap with input wall segments.

51. The medium of any previous item, wherein classifying cells of the tessellation as floor or not floor comprises: utilizing the output set of n-sided polygon cells to: convert the tessellation to a sparse system of linear equations and solve the sparse system of linear equations; and classify individual cells as either part of the floor or not part of the floor based on the solved sparse system of linear equations.

52. The medium of any previous item, wherein extracting the floor plan polygon from cells classified as floor comprises: traversing each of the cells classified as part of the floor and extracting outline edges; and connecting the extracted outline edges head to tail to generate a set of vertices defining the floor plan polygon.

53. The medium of any previous item, the operations further comprising extracting the data items from the interactive three dimensional representation with a trained machine learning model, wherein extracting the data items includes providing the interactive three dimensional representation as an input to the trained machine learning model to identify the data items, wherein the trained machine learning model comprises a convolutional neural network (CNN) and is trained to identify objects and structures in multiple physical scenes as the data items.

54. The medium of any previous item, wherein the trained machine learning model is trained by: obtaining physical scene data associated with a specified physical scene at the location, wherein the physical scene data includes an image, a video or a three dimensional digital model associated with the specified physical scene; and training the machine learning model with the physical scene data to predict a specified set of surfaces and/or contents in the specified physical scene such that a cost function that is indicative of a difference between a reference set of surfaces and/or contents and the specified set of contents is minimized; wherein the trained machine learning model is configured to predict spatial localization data of the data items, the spatial localization data corresponding to location information of the surfaces and/or contents in the physical scene.

55. The medium of any previous item, the operations further comprising determining one or more insurance underwriting estimates with the trained machine learning model based on the determined floor plan.

56. A method for executing an interactive three dimensional electronic representation of a physical scene at a location to determine a floor plan of the physical scene, the method comprising: receiving description data of the physical scene at the location, generating, with a trained machine learning model, the interactive three dimensional representation of the physical scene based on the description data, the interactive three dimensional representation comprising data items corresponding to surfaces and/or contents in the physical scene; and determining, based on the interactive three dimensional representation and the data items, the floor plan, by: transferring detections of physical scene structures indicated by the data items to the interactive three dimensional representation; determining co-planar regions of the three dimensional representation for wall separation; determining wall segments within a floor plane of the three dimensional representation; tessellating the floor plane using the determined wall segments; classifying cells of the tessellation as floor or not floor; and extracting a floor plan polygon from cells classified as floor.

57. The method of any previous item, wherein the interactive three dimensional representation of the physical scene is stored as a triangle mesh, which comprises a graph data structure storing lists of vertices and a list of indices that indicate which vertices are joined together as a triangle, with each vertex comprising attributes including a position, a color, a normal vector, a parametrization coordinate, an instance index and a semantic class index; and wherein transferring detections of physical scene structures indicated by the data items to the interactive three dimensional representation comprises: predicting, with a trained machine learning model, semantic classes for two dimensional input video frames included in the description data, projecting mesh vertices onto a camera image plane to map each of the mesh's vertices to image coordinates and determine a predicted label; determining whether a projected mesh vertex falls into a region labeled as a floor; and determining a per mesh triangle label, where a triangle is labeled as part of the floor if all of its adjacent vertices are labeled as floor.

58. The method of any previous item, wherein the interactive three dimensional representation of the physical scene is stored as a triangle mesh, and wherein determining co-planar regions of the three dimensional representation for wall separation comprises: determining a dual of the triangle mesh; and utilizing a Union-Find data structure to separate triangles labeled as walls into separate walls.

59. The method of any previous item, wherein determining wall segments within the floor plane of the three dimensional representation comprises: intersecting each of two or more wall planar regions with a floor region, to yield a set of two dimensional lines within a floor plane; converting the two dimensional lines to segments; and storing a normal vector associated with each wall plane.

60. The method of any previous item, wherein tessellating the floor plane using the determined wall segments comprises: determining a bounding rectangle that bounds wall segments and extend the bounding rectangle by a predetermined amount in all directions to create an initial cell comprising four vertices at the bounding rectangle corners; splitting the initial cell by cutting it using lines defined by each of the wall segments, and store an amount that resulting edges of a tessellation overlap with each of the wall segments; and outputting a set of n-sided polygon cells with edges that store weights proportional to their overlap with input wall segments.

61. The method of any previous item, wherein classifying cells of the tessellation as floor or not floor comprises: utilizing the output set of n-sided polygon cells to: convert the tessellation to a sparse system of linear equations and solve the sparse system of linear equations; and classify individual cells as either part of the floor or not part of the floor based on the solved sparse system of linear equations.

62. The method of any previous item, wherein extracting the floor plan polygon from cells classified as floor comprises: traversing each of the cells classified as part of the floor and extracting outline edges; and connecting the extracted outline edges head to tail to generate a set of vertices defining the floor plan polygon.

63. The method of any previous item, further comprising extracting the data items from the interactive three dimensional representation with a trained machine learning model, wherein extracting the data items includes providing the interactive three dimensional representation as an input to the trained machine learning model to identify the data items, wherein the trained machine learning model comprises a convolutional neural network (CNN) and is trained to identify objects and structures in multiple physical scenes as the data items.

64. The method of any previous item, wherein the trained machine learning model is trained by: obtaining physical scene data associated with a specified physical scene at the location, wherein the physical scene data includes an image, a video or a three dimensional digital model associated with the specified physical scene; and training the machine learning model with the physical scene data to predict a specified set of surfaces and/or contents in the specified physical scene such that a cost function that is indicative of a difference between a reference set of surfaces and/or contents and the specified set of contents is minimized; wherein the trained machine learning model is configured to predict spatial localization data of the data items, the spatial localization data corresponding to location information of the surfaces and/or contents in the physical scene.

65. The method of any previous item, further comprising determining one or more insurance underwriting estimates with the trained machine learning model based on the determined floor plan.

66. A non-transitory computer readable medium having instructions thereon, the instructions configured to cause a computer to execute an interactive three dimensional electronic representation of a physical scene at a location to determine one or more walls of the physical scene, the instructions causing operations comprising: receiving description data of the physical scene at the location, generating, with a trained machine learning model, the interactive three dimensional representation of the physical scene based on the description data, the interactive three dimensional representation comprising data items corresponding to surfaces and/or contents in the physical scene; and determining, based on the interactive three dimensional representation and the data items, the one or more walls, by: transferring detections of physical scene structures indicated by the data items to the interactive three dimensional representation; extruding wall rectangles from a floor plan of the physical scene, the floor plan previously determined based on the interactive three dimensional representation; determining co-planar regions of the three dimensional representation for separation of cut outs comprising windows, doors, and/or vents in the one or more walls; determining a bounding rectangle for each separated cut out; filtering detected cut outs; associating a bounding rectangle with a wall rectangle; and projecting bounding rectangles to an associated wall to determine the wall surface area in the physical scene.

67. The medium of any previous item, wherein the interactive three dimensional representation of the physical scene is stored as a triangle mesh, which comprises a graph data structure storing lists of vertices and a list of indices that indicate which vertices are joined together as a triangle, with each vertex comprising attributes including a position, a color, a normal vector, a parametrization coordinate, an instance index and a semantic class index; and wherein transferring detections of physical scene structures indicated by the data items to the interactive three dimensional representation comprises: predicting, with a trained machine learning model, semantic classes for two dimensional input video frames included in the description data, projecting mesh vertices onto a camera image plane to map each of the mesh's vertices to image coordinates and determine a predicted label; determining whether a projected mesh vertex falls into a region labeled as a floor; and determining a per mesh triangle label, where a triangle is labeled as part of the floor if all of its adjacent vertices are labeled as floor.

68. The medium of any previous item, wherein extruding wall rectangles from a floor plan of the physical scene comprises: determining a centroid of triangles labeled as floor, and a centroid of triangles labeled as ceiling; determining a Euclidean distance between the centroids of the triangles labeled as floor and the triangles labeled as ceiling; determining a normal vector for a floor plan polygon; and determining a wall rectangle that extends along the Euclidean distance in a direction of the normal vector for each boundary edge of the floor plan polygon.

69. The medium of any previous item, wherein determining co-planar regions of the three dimensional representation for separation of cut outs comprising windows, doors, and/or vents in the one or more walls comprises: determining a dual of the triangle mesh of the interactive three dimensional representation to convert each triangle into a vertex and join triangles together if original triangles were neighbors, and, for each new vertex, storing a position, determined as an average of an original triangle's vertex positions, and a normal vector; associating a weight with every edge of a new dual mesh, based on an angle between normal vectors stored at each vertex; sorting the edges based on the angles in an ascending order, which defines an iteration order; determining an angle between normal vectors stored at each vertex and determining whether an angle is less than a predefined angle threshold; determining symmetric point-to-plane distances and determining whether the distances are less than a predefined distance threshold; determining whether two vertices have a same semantic class, which indicates that vertices belonging to the same semantic class and lying on a same plane in three dimensional space are connected; and copying instance indices back into the triangle mesh, and splitting the triangles labeled as a single semantic region into separate, co-planar semantic region segments.

70. The medium of any previous item, wherein determining the one or more bounding rectangles comprises: determining an average normal vector from all triangles of the triangle mesh that belong to a same segment; determining a set of three dimensional basis vectors based on the average normal vector; determining a centroid of each segment; determining a maximum distance to each of the vertices belonging to a current segment; and specifying the bounding rectangle as a list of rectangle vertices such that each segment comprises a list of triangles, the list of rectangle vertices, an average normal vector, and a centroid.

71. The medium of any previous item, wherein filtering detected cut outs comprises: determining a cut out area as a sum of areas of mesh triangles that belong to a corresponding segment; and determining a point-to-plane distance between the corresponding segment's centroid and all wall rectangles sharing a same orientation as the corresponding segment to find a distance to a closest, similarly oriented wall.

72. The medium of any previous item, wherein associating a bounding rectangle with a wall rectangle comprises: associating each cut out with wall rectangles, by determining a closest wall rectangle for each cut out, wherein a distance between rectangles is a function of a normal vector angle and a point-to-plane distance; projecting cut out vertices onto a wall plane; storing a set of wall rectangles with associated cut out rectangles; determining a wall area of the one or more walls by computing an area of a wall rectangle and subtracting areas of associated cut outs.

73. The medium of any previous item, the operations further comprising extracting the data items from the interactive three dimensional representation with a trained machine learning model, wherein extracting the data items includes providing the interactive three dimensional representation as an input to the trained machine learning model to identify the data items, wherein the trained machine learning model comprises a convolutional neural network (CNN) and is trained to identify objects and structures in multiple physical scenes as the data items.

74. The medium of any previous item, wherein the trained machine learning model is trained by: obtaining physical scene data associated with a specified physical scene at the location, wherein the physical scene data includes an image, a video or a three dimensional digital model associated with the specified physical scene; and training the machine learning model with the physical scene data to predict a specified set of surfaces and/or contents in the specified physical scene such that a cost function that is indicative of a difference between a reference set of surfaces and/or contents and the specified set of contents is minimized; wherein the trained machine learning model is configured to predict spatial localization data of the data items, the spatial localization data corresponding to location information of the surfaces and/or contents in the physical scene.

75. The medium of any previous item, the operations further comprising determining one or more insurance underwriting estimates with the trained machine learning model based on the determined one or more walls.

76. A method for executing an interactive three dimensional electronic representation of a physical scene at a location to determine one or more walls of the physical scene, the method comprising: receiving description data of the physical scene at the location, generating, with a trained machine learning model, the interactive three dimensional representation of the physical scene based on the description data, the interactive three dimensional representation comprising data items corresponding to surfaces and/or contents in the physical scene; and determining, based on the interactive three dimensional representation and the data items, the one or more walls, by: transferring detections of physical scene structures indicated by the data items to the interactive three dimensional representation; extruding wall rectangles from a floor plan of the physical scene, the floor plan previously determined based on the interactive three dimensional representation; determining co-planar regions of the three dimensional representation for separation of cut outs comprising windows, doors, and/or vents in the one or more walls; determining a bounding rectangle for each separated cut out; filtering detected cut outs; associating a bounding rectangle with a wall rectangle; and projecting bounding rectangles to an associated wall to determine the wall surface area in the physical scene.

77. The method of any previous item, wherein the interactive three dimensional representation of the physical scene is stored as a triangle mesh, which comprises a graph data structure storing lists of vertices and a list of indices that indicate which vertices are joined together as a triangle, with each vertex comprising attributes including a position, a color, a normal vector, a parametrization coordinate, an instance index and a semantic class index; and wherein transferring detections of physical scene structures indicated by the data items to the interactive three dimensional representation comprises: predicting, with a trained machine learning model, semantic classes for two dimensional input video frames included in the description data, projecting mesh vertices onto a camera image plane to map each of the mesh's vertices to image coordinates and determine a predicted label; determining whether a projected mesh vertex falls into a region labeled as a floor; and determining a per mesh triangle label, where a triangle is labeled as part of the floor if all of its adjacent vertices are labeled as floor.

78. The method of any previous item, wherein extruding wall rectangles from a floor plan of the physical scene comprises: determining a centroid of triangles labeled as floor, and a centroid of triangles labeled as ceiling; determining a Euclidean distance between the centroids of the triangles labeled as floor and the triangles labeled as ceiling; determining a normal vector for a floor plan polygon; and determining a wall rectangle that extends along the Euclidean distance in a direction of the normal vector for each boundary edge of the floor plan polygon.

79. The method of any previous item, wherein determining co-planar regions of the three dimensional representation for separation of cut outs comprising windows, doors, and/or vents in the one or more walls comprises: determining a dual of the triangle mesh of the interactive three dimensional representation to convert each triangle into a vertex and join triangles together if original triangles were neighbors, and, for each new vertex, storing a position, determined as an average of an original triangle's vertex positions, and a normal vector; associating a weight with every edge of a new dual mesh, based on an angle between normal vectors stored at each vertex; sorting the edges based on the angles in an ascending order, which defines an iteration order; determining an angle between normal vectors stored at each vertex and determining whether an angle is less than a predefined angle threshold; determining symmetric point-to-plane distances and determining whether the distances are less than a predefined distance threshold; determining whether two vertices have a same semantic class, which indicates that vertices belonging to the same semantic class and lying on a same plane in three dimensional space are connected; and copying instance indices back into the triangle mesh, and splitting the triangles labeled as a single semantic region into separate, co-planar semantic region segments.

80. The method of any previous item, wherein determining the one or more bounding rectangles comprises: determining an average normal vector from all triangles of the triangle mesh that belong to a same segment; determining a set of three dimensional basis vectors based on the average normal vector; determining a centroid of each segment; determining a maximum distance to each of the vertices belonging to a current segment; and specifying the bounding rectangle as a list of rectangle vertices such that each segment comprises a list of triangles, the list of rectangle vertices, an average normal vector, and a centroid.

81. The method of any previous item, wherein filtering detected cut outs comprises: determining a cut out area as a sum of areas of mesh triangles that belong to a corresponding segment; and determining a point-to-plane distance between the corresponding segment's centroid and all wall rectangles sharing a same orientation as the corresponding segment to find a distance to a closest, similarly oriented wall.

82. The method of any previous item, wherein associating a bounding rectangle with a wall rectangle comprises: associating each cut out with wall rectangles, by determining a closest wall rectangle for each cut out, wherein a distance between rectangles is a function of a normal vector angle and a point-to-plane distance; projecting cut out vertices onto a wall plane; storing a set of wall rectangles with associated cut out rectangles; determining a wall area of the one or more walls by computing an area of a wall rectangle and subtracting areas of associated cut outs.

83. The method of any previous item, further comprising extracting the data items from the interactive three dimensional representation with a trained machine learning model, wherein extracting the data items includes providing the interactive three dimensional representation as an input to the trained machine learning model to identify the data items, wherein the trained machine learning model comprises a convolutional neural network (CNN) and is trained to identify objects and structures in multiple physical scenes as the data items.

84. The method of any previous item, wherein the trained machine learning model is trained by: obtaining physical scene data associated with a specified physical scene at the location, wherein the physical scene data includes an image, a video or a three dimensional digital model associated with the specified physical scene; and training the machine learning model with the physical scene data to predict a specified set of surfaces and/or contents in the specified physical scene such that a cost function that is indicative of a difference between a reference set of surfaces and/or contents and the specified set of contents is minimized; wherein the trained machine learning model is configured to predict spatial localization data of the data items, the spatial localization data corresponding to location information of the surfaces and/or contents in the physical scene.

85. The method of any previous item, further comprising determining one or more insurance underwriting estimates with the trained machine learning model based on the determined one or more walls.

86. A system comprising one or more processors and machine readable instructions stored on a computer readable medium, the system configured for performing method steps and/or operations comprising those of any previous item.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" (or "computer readable medium") refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" (or "computer readable signal") refers to any signal used to provide machine instructions and/or data to a programmable processor. The machine-readable medium can store such machine instructions nontransitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, computer programs and/or articles depending on the desired configuration. Any methods or the logic flows depicted in the accompanying figures and/or described herein do not necessarily require the particular order shown, or sequential order, to achieve desirable results. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. The implementations described above can be directed to various combinations and sub combinations of the disclosed features and/or combinations and sub combinations of further features noted above. Furthermore, above described advantages are not intended to limit the application of any issued claims to processes and structures accomplishing any or all of the advantages.

Additionally, section headings shall not limit or characterize the invention(s) set out in any claims that may issue from this disclosure. Further, the description of a technology in the "Background" is not to be construed as an admission that technology is prior art to any invention(s) in this disclosure. Neither is the "Summary" to be considered as a characterization of the invention(s) set forth in issued claims. Furthermore, any reference to this disclosure in general or use of the word "invention" in the singular is not intended to imply any limitation on the scope of the claims set forth below. Multiple inventions may be set forth according to the limitations of the multiple claims issuing from this disclosure, and such claims accordingly define the invention(s), and their equivalents, that are protected thereby.

What is claimed is:

1. A non-transitory computer readable medium having instructions thereon, the instructions configured to cause a computer to execute, in a browser, an interactive three dimensional electronic representation of a physical scene at a location to determine attributes of the physical scene, the browser having a limited computing capability compared to a native application or hardware usable by the computer, the interactive three dimensional representation configured to minimize overall computing resources and processing time for determining the attributes, the instructions causing operations comprising:

receiving video images of the physical scene, the video images generated via a camera associated with a user;

generating, with a trained machine learning model, the interactive three dimensional representation of the physical scene, wherein the interactive three dimensional representation comprises a textured or untextured three-dimensional mesh with vertices connected by edges, defining triangular or quadrilateral planar faces, wherein the vertices and the faces each separately comprise position, color, and/or surface normal information;

extracting data items from the interactive three dimensional representation with the trained machine learning model, wherein the data items correspond to surfaces and/or contents in the physical scene;

determining attributes of the data items with the trained machine learning model, the attributes comprising dimensions and/or locations of the surfaces and/or contents;

identifying a subset of the data items with the trained machine learning model, the subset of the data items comprising a ceiling, a floor, and walls of the physical scene; and causing interactive human verification of the attributes of the subset of data items by:
receiving user selection of the ceiling, the floor, or a wall, and flattening a view of the selected ceiling, floor, or wall from the interactive three dimensional representation to two dimensions;
receiving user adjustments to the dimensions and/or locations of the selected ceiling, floor, or wall;
receiving user indications of cut outs in the selected ceiling, floor, or wall, a cut out comprising a window, a door, or a vent in the selected ceiling, floor, or wall; and
updating, with the trained machine learning model, the interactive three dimensional representation based on adjustments to the dimensions and/or locations, and/or the indications of cut outs for continued display an manipulation in the browser;

wherein the trained machine learning model is trained by:
obtaining physical scene data associated with a specified physical scene at the location, wherein the physical scene data includes an image, a video or a prior three dimensional digital model associated with the specified physical scene; and
training the machine learning model with the physical scene data to predict a specified set of surfaces and/or contents in the specified physical scene such that a cost function that is indicative of a difference between a reference set of surfaces and/or contents and the specified set of contents is minimized.

2. The medium of claim 1, wherein generating the interactive three dimensional representation of the physical scene comprises rendering the mesh for manipulation by the user in the browser with limited computing resources, such that artifacts that are no longer being actively used are disposed of, those artifacts that can be reused are stored, and new artifacts are added only as needed, wherein the artifacts comprise metadata associated with mesh faces.

3. The medium of claim 1, wherein the video images include interior and/or exterior condition information about the location, wherein the interior and/or exterior condition information comprises a description of a geographical position of the location; and wherein the description of the geographical position of the location is compared to corresponding information for the location from an external location information database.

4. The medium of claim 1, wherein the trained machine learning model is trained with training data, the training data comprising input output training pairs associated with each potential data item.

5. A non-transitory computer readable medium having instructions thereon, the instructions configured to cause a computer to execute an interactive three dimensional electronic representation of a physical scene at a location to determine attributes of the physical scene, the instructions causing operations comprising:
receiving description data of the physical scene at the location,
generating, with a trained machine learning model, the interactive three dimensional representation of the physical scene based on the description data, the interactive three dimensional representation comprising data items corresponding to surfaces and/or contents in the physical scene; and
causing, in a browser running on the computer, interactive human verification of attributes of a subset of data items by:
receiving user selection of a data item comprising a ceiling, a floor, or a wall of the physical scene, and flattening a view of the selected ceiling, floor, or wall from the interactive three dimensional representation to two dimensions;
receiving user adjustments to attributes including dimensions and/or a location of the selected ceiling, floor, or wall;
receiving user indications of cut outs in the selected ceiling, floor, or wall; and
updating, with the trained machine learning model, the interactive three dimensional representation based on user adjustments to the dimensions and/or locations, and/or the indications of cut outs, for continued display and manipulation in the browser;

wherein the trained machine learning model is trained by:
obtaining physical scene data associated with a specified physical scene at the location, wherein the physical scene data includes an image, a video, or a three dimensional digital model associated with the specified physical scene; and
training the machine learning model with the physical scene data to predict a specified set of surfaces and/or contents in the specified physical scene such that a cost function that is indicative of a difference between a reference set of surfaces and/or contents and the specified set of contents is minimized.

6. The medium of claim 5, wherein generating the interactive three dimensional representation of the physical scene comprises rendering a mesh for manipulation by the user in the browser with limited computing resources, such that artifacts that are no longer being actively used are disposed of, those artifacts that can be reused are stored, and new artifacts are added only as needed, wherein the artifacts comprise metadata associated with mesh faces.

7. The medium of claim 5, wherein the trained machine learning model is trained with training data, the training data comprising input output training pairs associated with each potential data item.

8. The medium of claim 5, wherein description data comprises one or more images of the physical scene, and the one or more images are generated via a camera associated with a user.

9. The medium of claim 5, wherein the interactive three dimensional representation comprises a textured or untextured three-dimensional mesh with vertices connected by edges, defining triangular or quadrilateral planar faces, wherein the vertices and the faces each separately comprise position, color, and/or surface normal information.

10. The medium of claim 5, the operations further comprising extracting data items from the interactive three dimensional representation with the trained machine learning model.

11. The medium of claim 10, wherein extracting the data items includes providing the interactive three dimensional representation as an input to the trained machine learning model to identify the data items, wherein the trained machine learning model comprises a convolutional neural network (CNN) and is trained to identify objects and structures in multiple physical scenes as the data items.

12. The medium of claim 5, the operations further comprising determining the attributes of the data items with the trained machine learning model, the attributes comprising dimensions and/or locations of the surfaces and/or contents.

13. The medium of claim 5, the operations further comprising identifying the subset of the data items with the trained machine learning model, the subset of the data items comprising the ceiling, the floor, and the walls of the physical scene.

14. The medium of claim 5, wherein the trained machine learning model is configured to predict spatial localization data of the data items, the spatial localization data corresponding to location information of the surfaces and/or contents in the physical scene.

15. The medium of claim 5, wherein the description data is generated via at least one of a camera, a user interface, an environment sensor, and an external location information database, the description data comprising one or more images of the physical scene.

16. The medium of claim 5, wherein a cut out comprises a window, a door, or a vent in a selected ceiling, floor, or wall.

17. The medium of claim 5, wherein the description data comprises one or more media types, the one or more media types comprising at least one or more of video data, image data, audio data, text data, user interface/display data, and/or sensor data, and wherein receiving description data comprises receiving sensor data from one or more environment sensors, the one or more environment sensors comprising at least one of a GPS, an accelerometer, a gyroscope, a barometer, or a microphone.

18. The medium of claim 5, the operations further comprising determining one or more insurance underwriting estimates with the trained machine learning model based on an updated interactive three dimensional representation.

19. The medium of claim 5, the operations further comprising determining point to point measurements in the interactive three dimensional representation, determining area measurements of one or more data items, and/or receiving user annotations related to one or more of the data items.

20. The medium of claim 5, wherein the description data is time stamped, geo stamped, and/or user stamped.

21. The medium of claim 20, wherein the description data includes interior and/or exterior condition information about the location, wherein the interior and/or exterior condition information comprises a description of a geographical position of the location; and wherein the description of the geographical position of the location is compared to corresponding information for the location from an external location information database.

22. The medium of claim 5, wherein flattening the view of the selected ceiling, floor, or wall from the interactive three dimensional representation to two dimensions comprises flattening a height or depth dimension in the view of the selected ceiling, floor, or wall, and forcing additional input form a user into a plane formed by the selected ceiling, floor, or wall.

23. The medium of claim 5, the operations further comprising moving a view of the physical scene in the interactive three dimensional electronic representation to match a position and field of view of a user's device that was used to obtain the description data by applying a background blur while moving a view.

24. A non-transitory computer readable medium having instructions thereon, the instructions configured to cause a computer to execute an interactive three dimensional electronic representation of a physical scene at a location to determine a floor plan of the physical scene, the instructions causing operations comprising:
 receiving description data of the physical scene at the location,
 generating, with a trained machine learning model, the interactive three dimensional representation of the physical scene based on the description data, the interactive three dimensional representation comprising data items corresponding to surfaces and/or contents in the physical scene; and
 determining, based on the interactive three dimensional representation and the data items, the floor plan, by:
  transferring detections of physical scene structures indicated by the data items to the interactive three dimensional representation;
  determining co-planar regions of the three dimensional representation for wall separation;
  determining wall segments within a floor plane of the three dimensional representation;
  tessellating the floor plane using the determined wall segments;
  classifying cells of the tessellation as floor or not floor; and
  extracting a floor plan polygon from cells classified as floor.

25. The medium of claim 24, wherein the interactive three dimensional representation of the physical scene is stored as a triangle mesh, which comprises a graph data structure storing lists of vertices and a list of indices that indicate which vertices are joined together as a triangle, with each vertex comprising attributes including a position, a color, a normal vector, a parametrization coordinate, an instance index and a semantic class index; and wherein transferring detections of physical scene structures indicated by the data items to the interactive three dimensional representation comprises:
 predicting, with a trained machine learning model, semantic classes for two dimensional input video frames included in the description data,
 projecting mesh vertices onto a camera image plane to map each of the mesh's vertices to image coordinates and determine a predicted label;
 determining whether a projected mesh vertex falls into a region labeled as a floor; and
 determining a per mesh triangle label, where a triangle is labeled as part of the floor if all of its adjacent vertices are labeled as floor.

26. The medium of claim 24, wherein the interactive three dimensional representation of the physical scene is stored as a triangle mesh, and wherein determining co-planar regions of the three dimensional representation for wall separation comprises:
 determining a dual of the triangle mesh; and
 utilizing a Union-Find data structure to separate triangles labeled as walls into separate walls.

27. The medium of claim 24, wherein determining wall segments within the floor plane of the three dimensional representation comprises:
 intersecting each of two or more wall planar regions with a floor region, to yield a set of two dimensional lines within a floor plane;
 converting the two dimensional lines to segments; and
 storing a normal vector associated with each wall plane.

28. The medium of claim 27, wherein tessellating the floor plane using the determined wall segments comprises:
 determining a bounding rectangle that bounds wall segments and extend the bounding rectangle by a predetermined amount in all directions to create an initial cell comprising four vertices at bounding rectangle corners;
 splitting the initial cell by cutting it using lines defined by each of the wall segments, and store an amount that resulting edges of a tessellation overlap with each of the wall segments; and
 outputting a set of n-sided polygon cells with edges that store weights proportional to their overlap with input wall segments.

29. The medium of claim 28, wherein classifying cells of the tessellation as floor or not floor comprises:
 utilizing the output set of n-sided polygon cells to:
  convert the tesselation to a sparse system of linear equations and solve the sparse system of linear equations; and
  classify individual cells as either part of the floor or not part of the floor based on the solved sparse system of linear equations.

30. The medium of claim 29, wherein extracting the floor plan polygon from cells classified as floor comprises:

traversing each of the cells classified as part of the floor and extracting outline edges; and connecting extracted outline edges head to tail to generate a set of vertices defining the floor plan polygon.

31. The medium of claim 24, the operations further comprising extracting the data items from the interactive three dimensional representation with a trained machine learning model, wherein extracting the data items includes providing video frames as an input to the trained machine learning model to identify the data items, wherein the trained machine learning model comprises a convolutional neural network (CNN) and is trained to identify objects and structures in multiple physical scenes as the data items.

32. The medium of claim 31, wherein the trained machine learning model is trained by:

obtaining physical scene data associated with a specified physical scene at the location, wherein the physical scene data includes an image, a video or a three dimensional digital model associated with the specified physical scene; and training the machine learning model with the physical scene data to predict a specified set of surfaces and/or contents in the specified physical scene such that a cost function that is indicative of a difference between a reference set of surfaces and/or contents and the specified set of contents is minimized;

wherein the trained machine learning model is configured to predict spatial localization data of the data items, the spatial localization data corresponding to location information of the surfaces and/or contents in the physical scene.

33. The medium of claim 24, the operations further comprising determining one or more insurance underwriting estimates with the trained machine learning model based on a determined floor plan.

34. A non-transitory computer readable medium having instructions thereon, the instructions configured to cause a computer to execute an interactive three dimensional electronic representation of a physical scene at a location to determine one or more walls of the physical scene, the instructions causing operations comprising:

receiving description data of the physical scene at the location, generating, with a trained machine learning model, the interactive three dimensional representation of the physical scene based on the description data, the interactive three dimensional representation comprising data items corresponding to surfaces and/or contents in the physical scene; and determining, based on the interactive three dimensional representation and the data items, the one or more walls, by:

transferring detections of physical scene structures indicated by the data items to the interactive three dimensional representation;

extruding wall rectangles from a floor plan of the physical scene, the floor plan previously determined based on the interactive three dimensional representation;

determining co-planar regions of the three dimensional representation for separation of cut outs comprising windows, doors, and/or vents in the one or more walls;

determining a bounding rectangle for each separated cut out;

filtering detected cut outs;

associating a bounding rectangle with a wall rectangle; and projecting bounding rectangles to an associated wall to determine the wall surface area in the physical scene.

35. The medium of claim 34, wherein the interactive three dimensional representation of the physical scene is stored as a triangle mesh, which comprises a graph data structure storing lists of vertices and a list of indices that indicate which vertices are joined together as a triangle, with each vertex comprising attributes including a position, a color, a normal vector, a parametrization coordinate, an instance index and a semantic class index; and wherein transferring detections of physical scene structures indicated by the data items to the interactive three dimensional representation comprises:

predicting, with a trained machine learning model, semantic classes for two dimensional input video frames included in the description data, projecting mesh vertices onto a camera image plane to map each of the mesh's vertices to image coordinates and determine a predicted label;

determining whether a corresponding vertex falls into any of regions labeled as either floor, ceiling, wall window, door; and determining a per mesh triangle label, where a triangle is labeled as part of either floor, ceiling, wall, window, or door if all of its adjacent vertices share the same label.

36. The medium of claim 35, wherein extruding wall rectangles from a floor plan of the physical scene comprises:

determining a centroid of triangles labeled as floor, and a centroid of triangles labeled as ceiling;

determining a Euclidean distance between the centroids of the triangles labeled as floor and the triangles labeled as ceiling;

determining a normal vector for a floor plan polygon; and determining a wall rectangle that extends along the Euclidean distance in a direction of the normal vector for each boundary edge of the floor plan polygon.

37. The medium of claim 36, wherein determining co-planar regions of the three dimensional representation for separation of cut outs comprising windows, doors, and/or vents in the one or more walls comprises:

determining a dual of the triangle mesh of the interactive three dimensional representation to convert each triangle into a vertex and join triangles together if original triangles were neighbors, and, for each new vertex, storing a position, determined as an average of an original triangle's vertex positions, and a normal vector;

associating a weight with every edge of a new dual mesh, based on an angle between normal vectors stored at each vertex;

sorting the edges based on the angles in an ascending order, which defines an iteration order;

determining an angle between normal vectors stored at each vertex and determining whether an angle is less than a predefined angle threshold;

determining symmetric point-to-plane distances and determining whether the distances are less than a predefined distance threshold;

determining whether two vertices have a same semantic class, which indicates that vertices belonging to the same semantic class and lying on a same plane in three dimensional space are connected; and copying instance indices back into the triangle mesh, and splitting the triangles labeled as a single semantic region into separate, co-planar semantic region segments.

38. The medium of claim 37, wherein determining the one or more bounding rectangles comprises:
determining an average normal vector from all triangles of the triangle mesh that belong to a same segment;
determining a set of three dimensional basis vectors based on the average normal vector;
determining a centroid of each segment;
determining a maximum distance to each of the vertices belonging to a current segment; and
specifying the bounding rectangle as a list of rectangle vertices such that each segment comprises a list of triangles, the list of rectangle vertices, an average normal vector, and a centroid.

39. The medium of claim 38, wherein filtering detected cut outs comprises:
determining a cut out area as a sum of areas of mesh triangles that belong to a corresponding segment; and
determining a point-to-plane distance between a corresponding segment's centroid and all wall rectangles sharing a same orientation as the corresponding segment to find a distance to a closest, similarly oriented wall.

40. The medium of claim 39, wherein associating a bounding rectangle with a wall rectangle comprises:
associating each cut out with wall rectangles, by determining a closest wall rectangle for each cut out, wherein a distance between rectangles is a function of a normal vector angle and a point-to-plane distance;
projecting cut out vertices onto a wall plane;
storing a set of wall rectangles with associated cut out rectangles; and
determining a wall area of the one or more walls by computing an area of a wall rectangle and subtracting areas of associated cut outs.

41. The medium of claim 34, the operations further comprising extracting the data items from the interactive three dimensional representation with a trained machine learning model, wherein extracting the data items includes providing the interactive three dimensional representation as an input to the trained machine learning model to identify the data items, wherein the trained machine learning model comprises a convolutional neural network (CNN) and is trained to identify objects and structures in multiple physical scenes as the data items.

42. The medium of claim 41, wherein the trained machine learning model is trained by:
obtaining physical scene data associated with a specified physical scene at the location, wherein the physical scene data includes an image, a video or a three dimensional digital model associated with the specified physical scene; and
training the machine learning model with the physical scene data to predict a specified set of surfaces and/or contents in the specified physical scene such that a cost function that is indicative of a difference between a reference set of surfaces and/or contents and the specified set of contents is minimized;
wherein the trained machine learning model is configured to predict spatial localization data of the data items, the spatial localization data corresponding to location information of the surfaces and/or contents in the physical scene.

43. The medium of claim 34, the operations further comprising determining one or more insurance underwriting estimates with the trained machine learning model based on the determined one or more walls.

* * * * *